US011678228B2

(12) United States Patent
Srivastava et al.

(10) Patent No.: US 11,678,228 B2
(45) Date of Patent: Jun. 13, 2023

(54) SRV6 USER-PLANE-BASED TRIGGERING METHODS AND APPARATUS FOR SESSION OR FLOW MIGRATION IN MOBILE NETWORKS

(71) Applicant: Cisco Technology, Inc., San Jose, CA (US)

(72) Inventors: Vimal Srivastava, Karnataka (IN); Srinath Gundavelli, San Jose, CA (US); Nagendra Kumar Nainar, Morrisville, NC (US); Carlos M. Pignataro, Cary, NC (US); Timothy Peter Stammers, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/542,826

(22) Filed: Dec. 6, 2021

(65) Prior Publication Data
US 2022/0225175 A1    Jul. 14, 2022

Related U.S. Application Data

(63) Continuation of application No. 17/088,030, filed on Nov. 3, 2020, now Pat. No. 11,202,236, which is a
(Continued)

(51) Int. Cl.
*H04W 36/00*    (2009.01)
*H04L 69/22*    (2022.01)
(Continued)

(52) U.S. Cl.
CPC ......... *H04W 36/0011* (2013.01); *H04L 69/22* (2013.01); *H04W 28/24* (2013.01); *H04W 36/08* (2013.01); *H04W 40/02* (2013.01)

(58) Field of Classification Search
CPC ... H04W 24/02; H04W 16/00; H04W 36/023; H04W 36/12; H04W 64/00; H04W 8/00;
(Continued)

(56) References Cited

U.S. PATENT DOCUMENTS 8,861,475 B2   10/2014  Jaiswal et al.
10,064,120 B2   8/2018  Olsson et al.
(Continued)

FOREIGN PATENT DOCUMENTS

CN       110300006 A  * 10/2019
WO         0172076 A1    9/2001
(Continued)

OTHER PUBLICATIONS

3GPP, "3rd Generation Partnership Project; Technical Specification Group Services and System Aspects; Study of Enablers for Network Automation for 5G (Release 16)", 3GPP TR 23.791 V16.0.0 (Dec. 19, 2018), 121 pages.
(Continued)

*Primary Examiner* — Matthew C Sams

(57) ABSTRACT

In one illustrative example, a user plane (UP) entity for use in a mobile network may receive a data packet from a user equipment (UE) operative to communicate in one or more sessions via a serving base station (BS) (e.g. eNB or gNB) of the mobile network. The UP entity may detect, in a header (e.g. SRH) of the data packet, an identifier indicating a new serving BS or session of the UE. The identifier may be UE- or BS-added data (e.g. iOAM data) that is inserted in the header by the UE or BS. In response, the UP entity may cause a message to be sent to an analytics function (e.g. a NWDAF) to perform analytics for session or flow migration for the UE.

20 Claims, 23 Drawing Sheets

Related U.S. Application Data continuation of application No. 16/244,545, filed on Jan. 10, 2019, now Pat. No. 10,887,799.

(51) Int. Cl.
    *H04W 28/24*     (2009.01)
    *H04W 36/08*     (2009.01)
    *H04W 40/02*     (2009.01)

(58) Field of Classification Search
CPC . H04W 36/0011; H04W 28/24; H04W 36/08; H04W 40/02; H04L 41/0823; H04L 61/2007; H04L 69/22
See application file for complete search history.

(56) References Cited

U.S. PATENT DOCUMENTS

| | | | |
|---|---|---|---|
| 10,404,592 | B2 | 9/2019 | Asati et al. |
| 10,419,982 | B1 | 9/2019 | Gundavelli et al. |
| 10,517,012 | B2 | 12/2019 | Gundavelli et al. |
| 10,841,974 | B1 | 11/2020 | Young et al. |
| 10,887,799 | B2 * | 1/2021 | Srivastava ........ H04W 36/0011 |
| 10,939,308 | B2 * | 3/2021 | Suthar ................ H04L 41/12 |
| 10,945,018 | B2 | 3/2021 | Rasmusson et al. |
| 10,945,108 | B2 | 3/2021 | Rasmusson et al. |
| 11,051,192 | B2 * | 6/2021 | Li ..................... H04L 41/14 |
| 11,202,236 | B2 * | 12/2021 | Srivastava ............ H04L 69/22 |
| 2005/0036462 | A1 | 2/2005 | Sillasto et al. |
| 2006/0251045 | A1 | 11/2006 | Okubo |
| 2009/0109924 | A1 | 4/2009 | Sato |
| 2010/0002651 | A1 | 1/2010 | Hofmann |
| 2010/0281249 | A1 * | 11/2010 | Das ..................... H04W 12/08 713/169 |
| 2011/0058530 | A1 | 3/2011 | Kim et al. |
| 2013/0301413 | A1 | 11/2013 | Moen et al. |
| 2014/0043993 | A1 | 2/2014 | Sirotkin et al. |
| 2014/0101305 | A1 | 4/2014 | Kelley, Jr. |
| 2015/0249690 | A1 | 9/2015 | Merino Vazquez et al. |
| 2015/0334027 | A1 | 11/2015 | Bosch et al. |
| 2016/0246252 | A1 | 8/2016 | Minoshima |
| 2016/0337919 | A1 | 11/2016 | Bindrim et al. |
| 2017/0250908 | A1 | 8/2017 | Nainar et al. |
| 2017/0289270 | A1 | 10/2017 | Li et al. |
| 2018/0176134 | A1 | 6/2018 | Pignataro et al. |
| 2018/0262924 | A1 | 9/2018 | Dao et al. |
| 2018/0352483 | A1 * | 12/2018 | Youn ................... H04W 76/11 |
| 2019/0028934 | A1 | 1/2019 | Rasanen et al. |
| 2019/0037474 | A1 | 1/2019 | Xu et al. |
| 2019/0110231 | A1 | 4/2019 | Youn et al. |
| 2019/0223047 | A1 | 7/2019 | Gundavelli et al. |
| 2019/0246252 | A1 | 8/2019 | Rasmusson et al. |
| 2019/0357081 | A1 | 11/2019 | Gottardi et al. |
| 2020/0170055 | A1 * | 5/2020 | Dou .................... H04W 64/003 |
| 2020/0195568 | A1 | 6/2020 | Ali et al. |
| 2020/0252813 | A1 * | 8/2020 | Li ..................... G06Q 20/382 |
| 2021/0022022 | A1 * | 1/2021 | Guo .................... H04L 41/14 |
| 2021/0243264 | A1 | 8/2021 | Yoon et al. |
| 2021/0250838 | A1 * | 8/2021 | Lu ..................... H04W 36/08 |
| 2021/0345158 | A1 * | 11/2021 | Puente Pestaña ..... H04W 24/10 |

FOREIGN PATENT DOCUMENTS

| | | | | |
|---|---|---|---|---|
| WO | | 2014178872 | A2 | 11/2014 |
| WO | | 2015113297 | A1 | 8/2015 |
| WO | | 2018006878 | A1 | 1/2018 |
| WO | | 2018008944 | A1 | 1/2018 |
| WO | WO- | 2019032968 | A1 * | 2/2019 ........... G06Q 20/382 |
| WO | WO- | 2022026482 | A1 * | 2/2022 |

OTHER PUBLICATIONS

Cisco Systems, "Pseudo-CR on SRv6 Introduction for User Plane", 3GPP TSG CT WG4 Meeting #86, West Palm Beach, US Aug. 20-24, 2018, 2 pages.

International Search Report and Written Opinion in counterpart International Application No. PCT/US2020/1019856, dated Mar. 24, 2020, 19 pages.

A. Sgambelluri et al., "SON and PCE Implementations for Segment Routing", Jun. 30-Jul. 2, 2015, 4 pages.

SoftBank Corp., "Pseudo-CR on SRv6 Impact for 5GC", 3GPP TR 29.892, C4-187226, 3GPP TSG CT WG4 Meeting #86-bis, Oct. 2018, 2 pages.

SoftBank Corp., "Pseudo-CR on SRv6 Impact on SMF", 3GPP TR 29.892, C4-187225, 3GPP TSG CT WG4 Meeting #86-bis, Oct. 2018, 2 pages.

3GPP, "3rd Generation Partnership Project; Technical Specification Group Core Network and Terminals; Study on User Plane Protocol in 5GC. (Release 16)", 3GPP TR 29.892 V0.3.0, Oct. 2018, 20 pages.

International Search Report and Written Opinion in counterpart International Application No. PCT/US2020/012122, dated Jun. 25, 2020, 20 pages.

Yang, Liu et al., "5G Core", ZTE Technologies, Dec. 1, 2018, vol. 20, No. 6, Issue 179, 44 pages.

Barmpounakis, Sokratis et al., "Data Analytics for 5G Networks: A Complete Framework for Network Access Selection and Traffic Steering", International Journal on Advances in Telecommunications, vol. 11 No. 3 & 4, 2018, 14 pages, http://www.iariajournals.org/telecommunications/.

Camarillo et al., "SRv6 Mobility Use-Cases draft-camarilloelmalky-springdmm-srv6-mob-usecases-00", Spring and DMM, Jul. 15, 2018, 14 pages.

Nowoswiat, David, "Why do you need a 5G cloud-native core?", Nokia Blog, Jul. 7, 2018, 8 pages. retrieved from Internet Feb. 2, 2020;https:/lwww.nokia.com/blog/why-do-you-need-5g-cloud-native-core/.

Brown, Gabriel et al., "Service-Oriented 5G Core Networks", Heavy Reading, Feb. 2017, 10 pages.

F. Brockners et al., "Proof of Transit," draft-ietf-sfc-proof-of-transit-00, Network Working Group, Internet-Draft, May 31, 2018, pp. 1-23.

F. Brockners et al., "Data Fields for In-Situ OAM", draft-ietf-ippm-ioam-data-03, Internet-Draft, Jun. 27, 2018, pp. 1-35.

C. Filsfils et al., "SRv6 Network Programming," draft-filsfils-spring-srv6-network-programming-03, Internet-Draft, Dec. 21, 2017, pp. 1-50.

C. Filsfils et al., "Segment Routing Architecture," draft-ieft-spring-segment-routing-14, Network Working Group, Internet-Draft, Dec. 20, 2017, pp. 1-31.

S. Matsushima et al., "Segment Routing IPv6 for Mobile User-Plane," draft-ieft-dmm,srv6-mobile-uplane-00, Internet-Draft, Nov. 30, 2017, pp. 1-20.

5G; 5G System Policy Control Service, Stage 3 (3GPP TS29.512 vesion 15.0.0 Release 15); ETSI TS 129 512 v15 0.0, Jun. 2018, pp. 1-83.

5G; 5G System; Network Data Analytics Services, Stage 3 (3GPP TS 29.520 version 15.0.0 Release 15), ETSI TS 129 520 V15.0.0, Jul. 2018, pp. 1-34.

\* cited by examiner

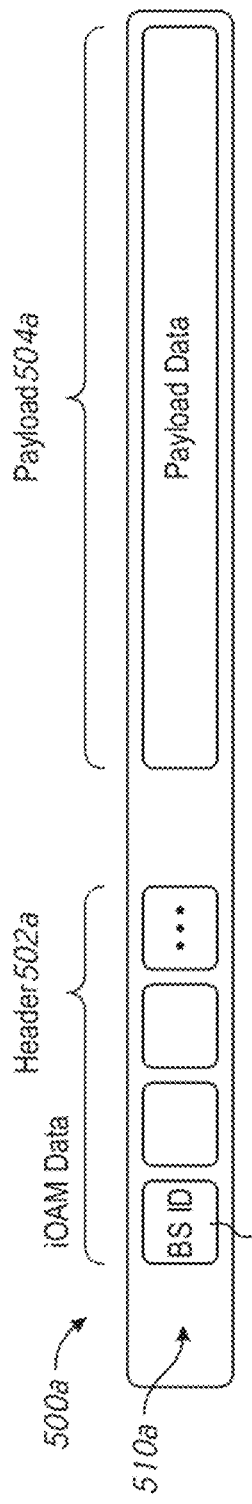
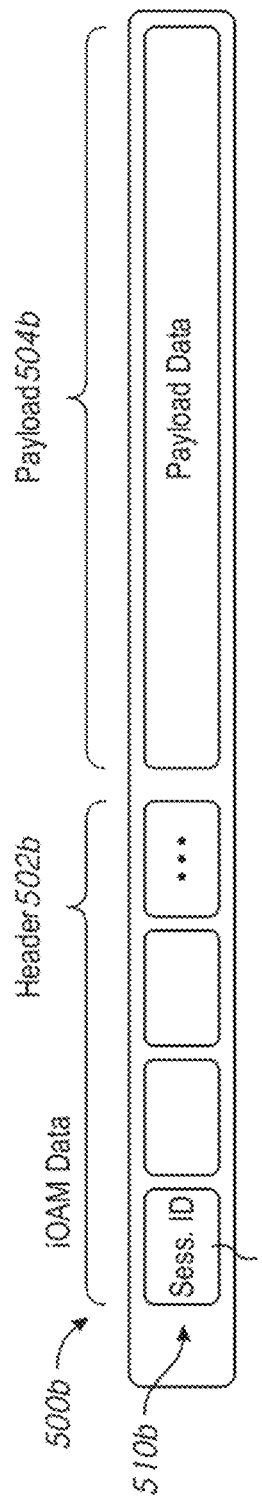
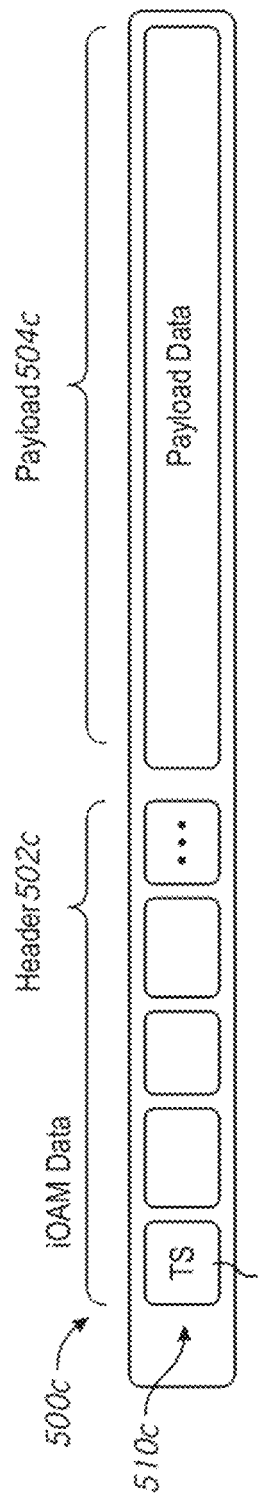
FIG. 5A
FIG. 5B
FIG. 5C

SRV6 USER-PLANE-BASED TRIGGERING METHODS AND APPARATUS FOR SESSION OR FLOW MIGRATION IN MOBILE NETWORKS

CROSS-REFERENCE TO RELATED APPLICATIONS

This application is a continuation of U.S. patent application Ser. No. 17/088,030, filed Nov. 3, 2020, now U.S. Pat. No. 11,202,236, which is a continuation of U.S. patent application Ser. No. 16/244,545 filed Jan. 10, 2019, now U.S. Pat. No. 10,887,799, the entirety of which is incorporated herein by reference.

TECHNICAL FIELD

The present disclosure relates to session or flow migration for session or flows of user equipment (UE) operating in mobile networks.

BACKGROUND

A user equipment (UE) may communicate in a 5G mobile network via a base station (e.g. gNB). One or more data packet flows of a PDU session of the UE may be routed (e.g. anchored) through a user plane function (UPF), where the session of the UE is managed and controlled by a session management function (SMF).

One or more conditions have been identified that may warrant a migration of the UE flows/session to a different UPF. For example, the communications of the UE may degrade in performance; the UE may be relocated to a different base station (e.g. a much longer route to reach the UPF); and/or the UE may add a new flow (e.g. a new flow that requires special UPF processing).

Accordingly, what are needed are mechanisms for triggering a session or flow migration for session or flows of a UE in a mobile network.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 5A-5C are illustrative representations of general message formats of data packets for use in SRv6 user-plane-based triggering for session or flow migration according to some implementations of the present disclosure;

DESCRIPTION OF EXAMPLE EMBODIMENTS

Figure 1A:
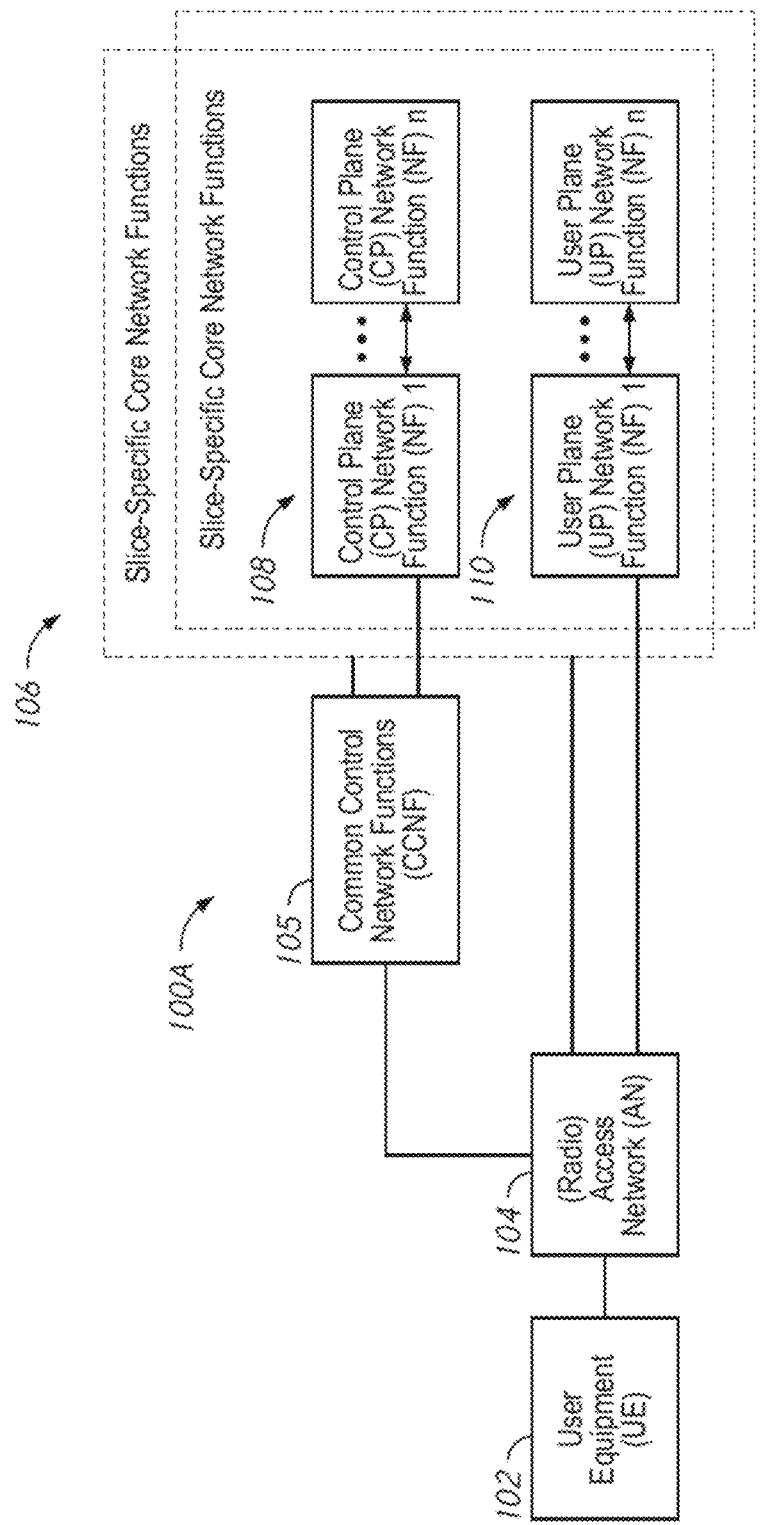
FIG. 1A is an illustrative representation of a basic network architecture of a Fifth Generation (5G) mobile network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Segment routing (SR) for IPv6 (SRv6) user-plane-based triggering methods and apparatus for session or flow migration in mobile networks are described herein.

In one illustrative example of the present disclosure, a user plane (UP) entity for use in a mobile network may receive a data packet from a user equipment (UE) operative to communicate in one or more sessions via a serving base station (BS) of the mobile network. The data packet may be a segment routing (SR) for IPv6 (SRv6) data packet. The UP entity may detect, in a header (e.g. SRH) of the data packet, an identifier indicating a new serving BS or session of the UE. The identifier may be UE- or B S-added data (e.g. iOAM data) that is inserted in the header by the UE.

In response, the UP entity may cause a message to be sent to an analytics function (e.g. a NWDAF) to perform analytics for session or flow migration for the UE. The analytics function may receive the message, perform the analytics, and send a message to a control plane (CP) entity for session management in response. The message may indicate an instruction to perform session or flow migration and/or contain resulting data of the analytics (e.g. information associated with a more suitable or optimal UP entity). In response to receiving the message, the CP entity for session management may perform session or flow migration of one or more sessions or flows of the UE from the UP entity to a different UP entity.

In some preferred implementations, it is the UE that inserts the identifier in the header of the data packet. In other implementations, it is the BS that inserts the identifier in the header of the data packet.

In another illustrative example of the present disclosure, a UP entity may receive a data packet from a UE operative to communicate in one or more sessions via a BS of the mobile network. The data packet may be an SRv6 data packet. The UP entity may identify a timestamp in a header (e.g. SRH) of the data packet. The timestamp may be UE- or BS-added data (e.g. iOAM data) that is inserted in the header by the UE or the BS. The UP entity may cause a message which includes timing information to be sent to an analytics function to perform analytics for session or flow migration for the UE based on the timing information. The timing information may be indicative of at least a timing of communication of the data packet between the BS and the UP entity, and may include or be derived from the timestamp. For example, the timing information may include the timestamp and at least one other timestamp associated with receipt of the data packet at the UP entity, or may include a time differential between the timestamp and at least one other timestamp associated with receipt of the data packet at the UP entity.

The analytics function may receive, from the UP entity, the message which includes the timing information and perform the analytics for session or flow migration for the UE in response. The analytics may include identifying whether the timing information satisfies a requirement or preference associated with a service level agreement (SLA) of the UE. The analytics function may send to a control plane (CP) entity for session management one or more messages which include an instruction to perform session or flow migration and/or contain resulting data of the analytics (e.g. information associated with a more suitable or optimal UP entity), based on identifying that the timing information fails to satisfy the requirement or preference associated with the SLA of the UE.

In addition, the analytics function may perform the analytics further by receiving, from a different UP entity, a message which includes other timing information and identify whether the other timing information from the other UP entity satisfies the requirement or preference associated with the SLA of the UE. The other timing information may be indicative of at least another timing of communication of the data packet between the BS and the different UP entity. The analytics function may send to the CP entity for session management the one or more messages which include an identification of the different UP entity based on identifying that the other timing information from the different UP entity satisfies the requirement or preference associated with the SLA of the UE.

More detailed and alternative techniques and implementations are provided herein as described below.

Example Embodiments

When a PDU session for a user equipment (UE) is established in a 5G mobile network, it is anchored on a user plane function (UPF) node and routed to a data network (DN). Selection of the UPF node is typically performed by a session management function (SMF) node, taking into consideration the most optimal traffic path. Due to UE mobility or some other occurrence, the route to the DN through the initially-selected UPF node may become less than optimal. The suboptimal condition could exist for the entire PDU session or for just some of the flows of the session.

There is a need to provide efficient triggering mechanisms for session or flow migration for UEs in order to (regularly) reconfigure sub-optimal session paths in order to achieve communication efficiency.

To better illustrate, FIG. 1A is an illustrative representation of a network architecture 100A of a 5G mobile network configured to facilitate communications for a user equipment (UE) 102. UE 102 may be an IoT or similar device. In general, network architecture 100a includes common control network functions (CCNF) 105 and a plurality of slice-specific core network functions 106. UE 102 may obtain access to the mobile network via an access network (AN) 104, which may be a radio access network (RAN). In the present disclosure, the UEs operating in the 5G mobile network may be any suitable type of devices, such as cellular telephones, smart phones, tablet devices, IoT devices, and machine-to-machine (M2M) communication devices, to name but a few. Techniques of the present disclosure may involve UEs that are IoT devices in an MIoT deployment.

CCNF 105 includes a plurality of network functions (NFs) which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of common functionalities provided by CCNF 105.

Slice-specific core network functions of network slices 106 are separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
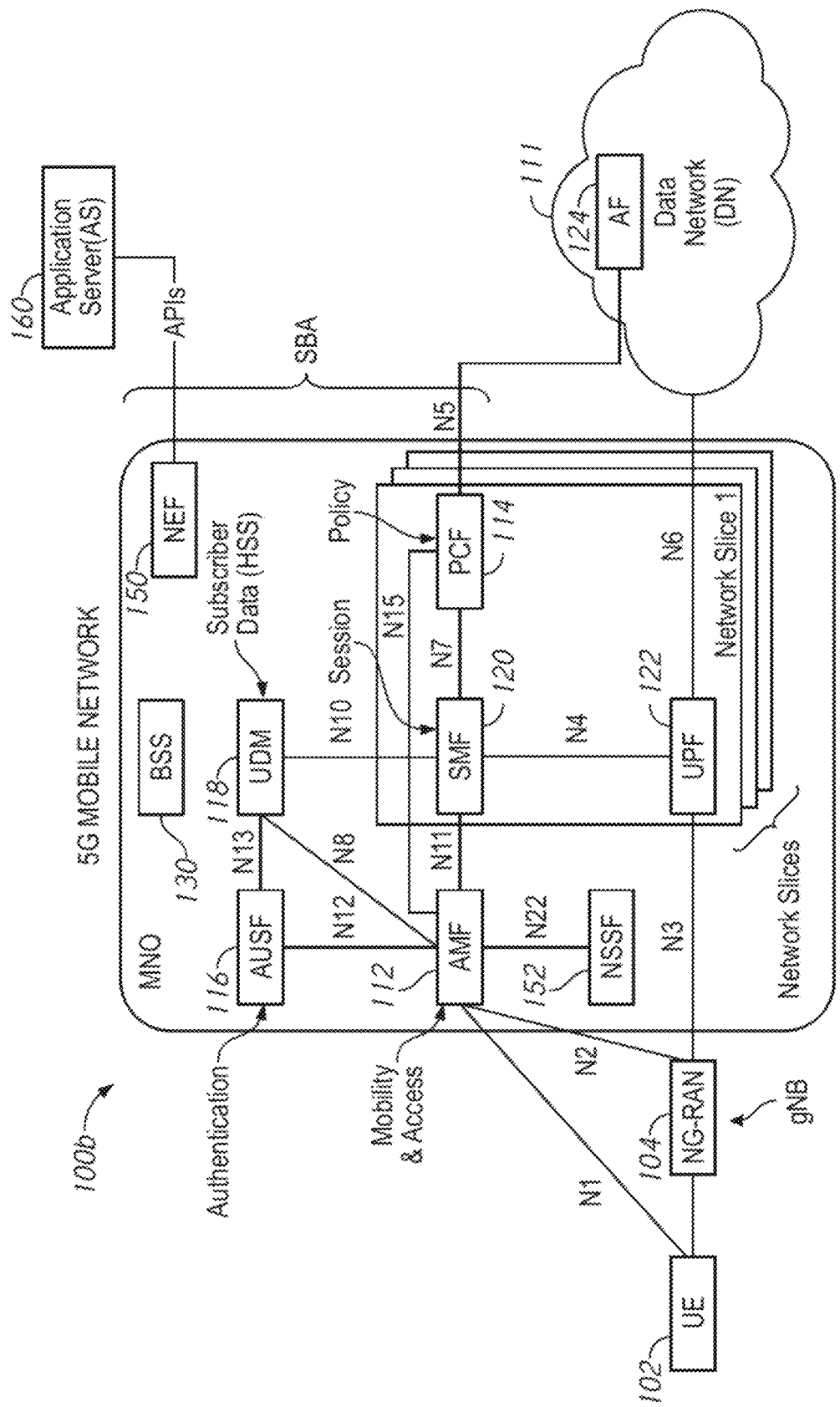
FIG. 1B is an illustrative representation of a more detailed network architecture of the mobile network of FIG. 1A.

FIG. 1B is an illustrative representation of a more detailed network architecture 100B of the 5G mobile network of FIG. 1A. As provided in 3GPP standards for 5G (e.g. 3GPP 23.501 and 23.502), network architecture 100b for the 5G mobile network which is operated by a mobile network operator (MNO) may include an authentication server function (AUSF) 116, a unified data management (UDM) 118 (having a unified data repository or UDR), an AMF 112, a policy control function (PCF) 114, an SMF 120, and a UPF 122. A plurality of interfaces and/or reference points N1-N8, N10-N13, N15, and N22 shown in FIG. 1B (as well as others) may define the communications and/or protocols between each of the entities, as described in the relevant (evolving) standards documents. One or more application functions, such as an application function (AF) 124, of a data network (DN) 111 may connect to the 5G mobile network via PCF 114 or UPF 122.

UPF 122 is part of the user plane and all other NFs (i.e. AMF 112, SMF 120, PCF 114, AUSF 116, and UDM 118) are part of the control plane. Separation of user and control planes guarantees that each plane resource can be scaled independently; it also allows UPFs to be deployed separately from CP functions in a distributed fashion. The NFs in the CP are modularized functions; for example, AMF and SMF are independent functions allowing for independent evolution and scaling. As specifically illustrated in FIG. 1B, NFs such as SMF 120 and UPF 122 of FIG. 1B may be provided as specific instances in a first network slice (e.g. network slice 1) of a plurality of network slice instances made available in the mobile network.

Also, as shown in FIG. 1B, a network exposure function (NEF) 150 may be provided in the mobile network. In general, NEF 150 may be configured to receive information from other NFs (e.g. based on exposed capabilities of other NFs) and store the received information as structured data. The storage operations may be performed with use of a standardized interface to a data storage network function. The stored information may be re-exposed by NEF 150 to other NFs and used for other purposes (e.g. analytics). One example use of NEF 150 is to assist in the establishment of an AS-initiated communication with a UE/IoT device, from an application server (AS) 180 through an API (e.g. where no other existing data connection exists).

Figure 1C:
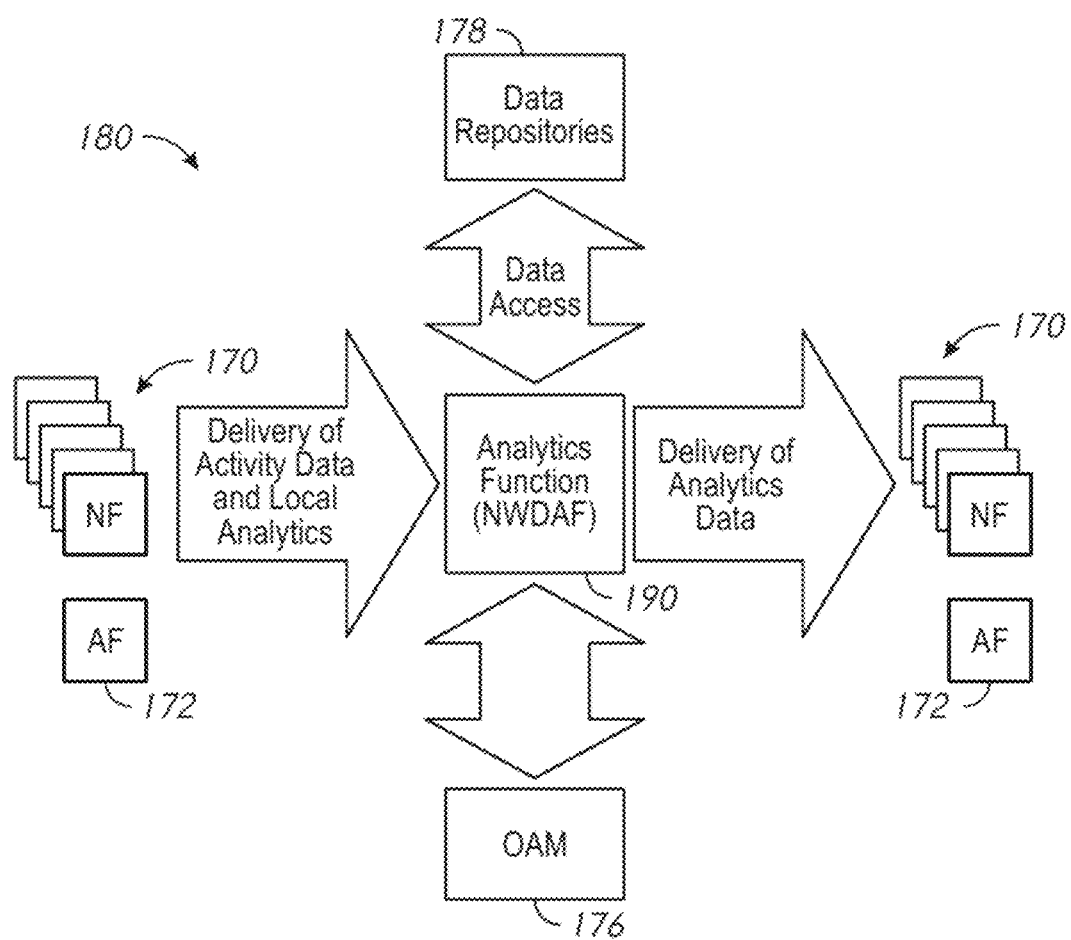
FIG. 1C is a network node arrangement including an analytics function which may also be provided in the mobile network.

As shown in a network node arrangement 180 of FIG. 1C, an analytics function 190 may also be provided in the 5G mobile network. Analytics function 190 may be a network data analytics function (NWDAF), as described in the relevant (evolving) standards documents, such TS 29.520 and others. Analytics function 190 may be used for data collection and data analytics in a centralized manner. Analytics function 190 may receive activity data and local analytics from NFs 170 or an AF 172, and/or access data from one or more data repositories 178. Resulting analytics data may be generated and sent or otherwise provided by analytics function 190 to the NFs and/or AF 172. Relevant interfaces associated with the NWDAF include the Na interface with the UPF, the Nb interface with the PCF, and the Nc interface with the SMF. Messaging and data may be communicated between analytics function 190 and OAM or OAM-processing nodes 176.

In the present disclosure, network elements in the mobile network may make use of segment routing (SR) for communications, including session communications, in relation to the defined interfaces/reference points. The segment routing (SR) may be SR for IPv6 (SRv6). To illustrate a few SRv6 examples, FIGS. 2A-2D are block diagrams of network nodes which are configured to route packets using SRv6.

Figure 2A:
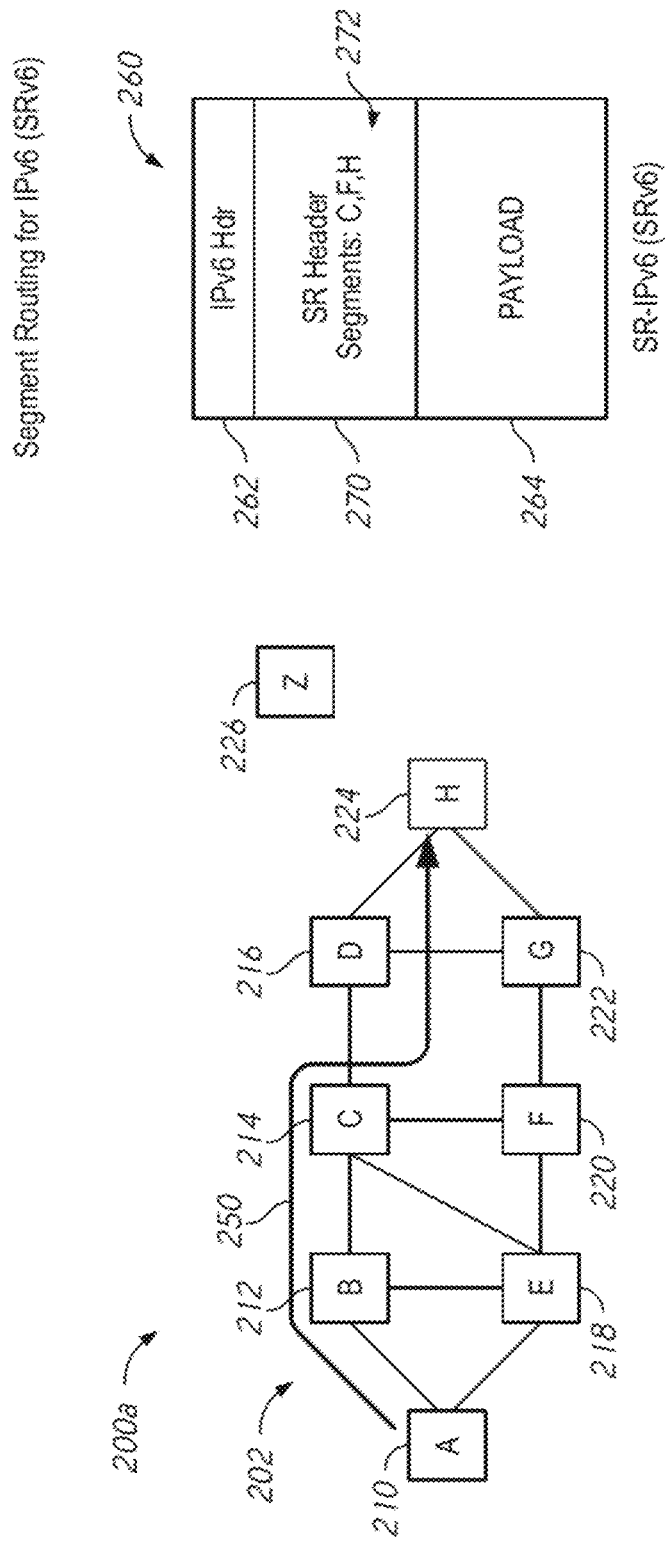
FIGS. 2A-2D are illustrative block diagrams of communication networks operative to route communications with use of segment routing (SR) and, in particular, with use of SR for IPv6 (SRv6)

With reference first to FIG. 2A, a network 200a which includes a plurality of nodes 202 (e.g. routers, servers, base stations (BSs), gateways, CP or UP entities, etc.) is shown. In this example, the plurality of nodes 202 includes nodes 210, 212, 214, 216, 218, 220, 222, 224, and 226 which are designated as nodes A, B, C, D, E, F, G, H, and Z, respectively. Here, node 210 (i.e. node A) is considered to be a source node and node 226 (i.e. node Z) is considered to be a destination node. Nodes 212, 214, 216, 218, 220, 222, and 226 which correspond to nodes B, C, D, E, F, and G are part of an SR domain (i.e. nodes that are SRv6-capable nodes/SRv6-configured nodes). The source node (node 210 or A) and the destination node (node 226 or Z) are not part of or outside of the SR domain (e.g. they may or may not be SRv6-configured nodes, such as "regular" IPv6 nodes).

A basic data format of an SR-IPv6 packet 260 for use in SRv6 routing is also shown in FIG. 2A. As illustrated, the data format of SR-IPv6 packet 260 includes an IPv6 header 262 and a payload 264. For SRv6 routing of IPv6 packet 260, the data format of IPv6 packet 260 further includes an SR header 270 or "SRH" (i.e. an extension header for SR as defined by RFC 2460). SR header 270 may include an ordered list of segments 272 which defines a network path 250 along which the SR-IPv6 packet 260 will be communicated in network 200a. In the example of FIG. 2A, the ordered list of segments 272 includes node 214 ("node C"), node 220 ("node F"), and node 224 ("node H") in network path 250. A segment is or includes an instruction (e.g. forwarding, servicing, application-specific, etc.) to be applied to the SR-IPv6 packet 260. Thus, an SR-IPv6 packet (e.g. SR-IPv6 packet 260) may be communicated in network 200a from a source node (e.g. node 210 or A) to a destination node (e.g. a node 226 or Z) along a desired or predetermined network path 250. The source node (e.g. node 210 or A) may operate to choose this network path 250 and encode it in the SR header 270 as the ordered list of segments 272. The rest of network 200a may operate to execute the encoded instructions without any further per-flow state.

Figure 2B:
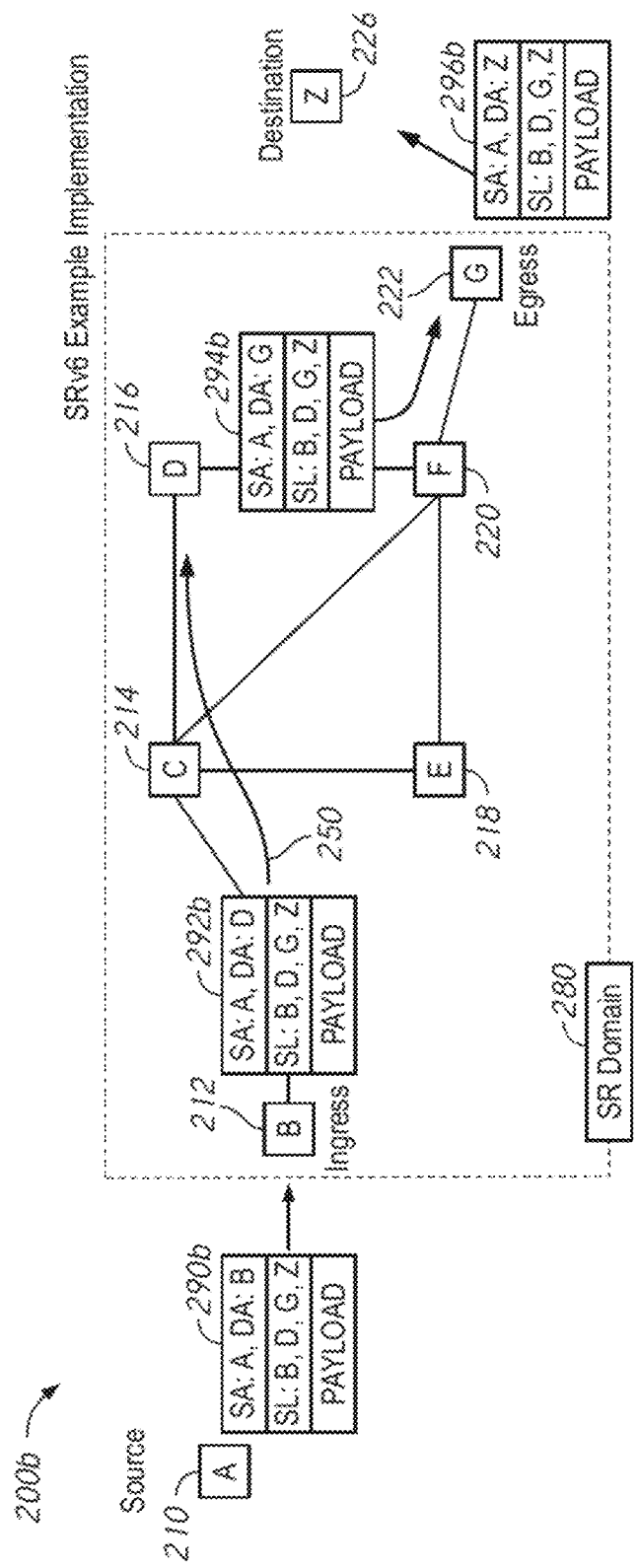

FIG. 2B is an illustrative representation of a network 200b which is similar to network 200a of FIG. 2A. Here, nodes 212, 214, 216, 218, 220, 222, and 226 which correspond to nodes B, C, D, E, F, and G are shown to be part of an SR domain 280. The source node (node 210 or A) and the destination node (node 226 or Z) are not part of or outside of the SR domain 280 (e.g. they may or may not be SRv6-configured nodes). In the example of FIG. 2B, node 212 or B may be considered as an ingress node of the SR domain 280 and node 222 or G may be considered as an egress node of the SR domain 280.

Note that an SR header may be inserted in an IPv6 packet at a source node or at an ingress node, or even encapsulated at the ingress node, as a few examples. In the example shown in FIG. 2B, an SR header of an IPv6 packet is inserted at the source node (node 210 or A) to produce an SR-IPv6 packet 290b. In this case, the source node (node 210 or A) which is SRv6-capable may originate the SR-IPv6 packet 290b. Here, the SR header of SR-IPv6 packet 290b includes an ordered list of segments (SL) designating nodes B, D, G, and Z to define network path 250. Initially, a source address (SA) of SR-IPv6 packet 290b is designated as node A and a destination address (DA) of SR-IPv6 packet 290b is designated as node B (i.e. the first node in the SL). When SR-IPv6 packet 290b is communicated to the ingress node (i.e. node 212 or B), the DA is modified by the ingress node to include the next or second node in the SL (i.e. node D), as indicated in SR-IPv6 packet 292b. When SR-IPv6 packet 292b is communicated to the node D (via node C), the DA is modified by node D to include the next or third node in the SL (i.e. node G), as indicated in SR-IPv6 packet 294b. When SR-IPv6 packet 294b is further communicated to the node G (via node F), the DA is modified by node G to include the next or fourth node in the SL (i.e. node Z which is the destination node), as indicated in SR-IPv6 packet 296b.

Figure 2C:
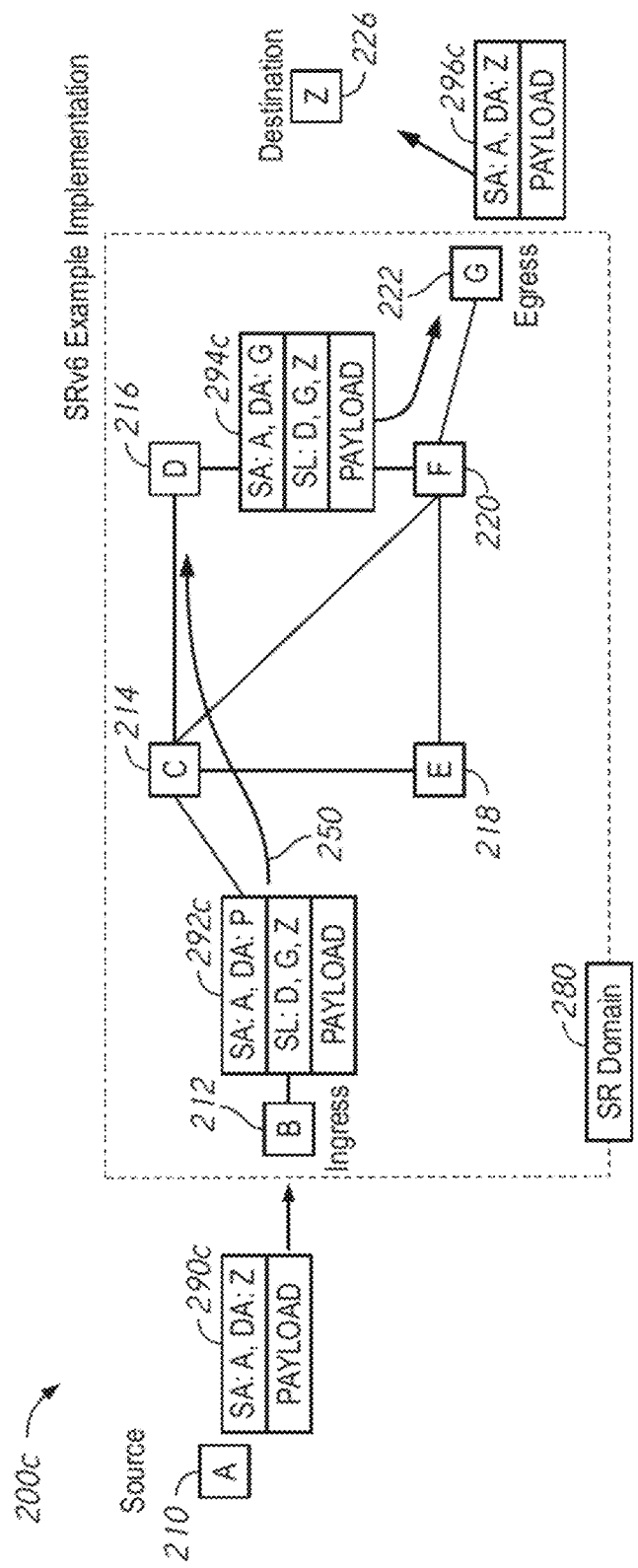

In the example of FIG. 2C, an SR header of an IPv6 packet 290c is inserted at the ingress node (node 212 or B) to produce an SR-IPv6 packet 292c. Here, the SR header of SR-IPv6 packet 292c includes an ordered list of segments (SL) designating nodes D, G, and Z to define network path 250. In this case, the source node, which may or may not be SRv6-configured, may originate the IPv6 packet 290c without any SR header. When SR-IPv6 packet 292c is communicated to node D (via node C), the DA is modified by node D to include the next or second node in the SL (i.e. node G), as indicated in SR-IPv6 packet 294c. When SR-IPv6 packet 294c is further communicated to the node G (via node F), the DA is modified by node G to include the next or third node in the SL (i.e. node Z, which is the destination node) and the SR header is removed, as indicated in IPv6 packet 296c. Here, similar to the source node, the destination node may or may not be SRv6-configured.

Figure 2D:
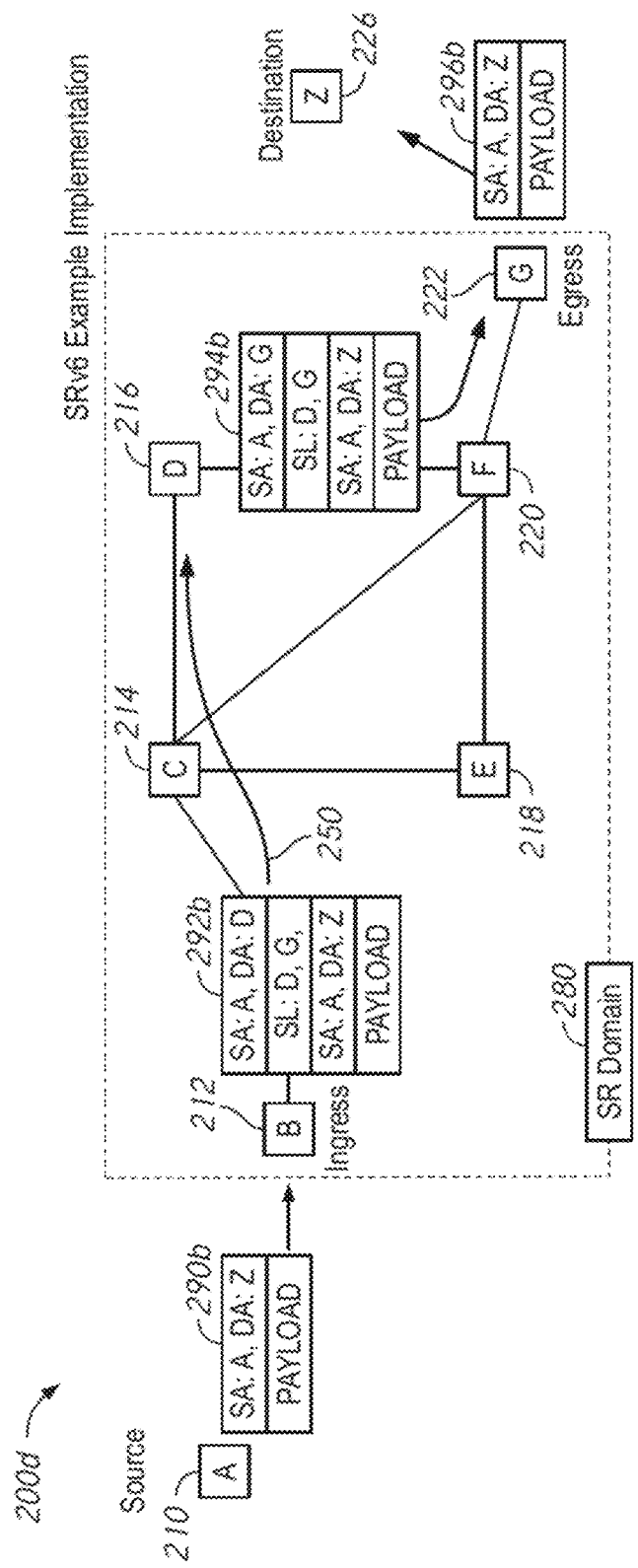

In the example of FIG. 2D, the source node, which may or may not be SRv6-configured, originates an IPv6 packet 290d without any SR header. The ingress node (node 212 or B) operates to encapsulate IPv6 packet 290d with a new, outer IPv6 header followed by an SR header, to produce an SR-IPv6 packet 292d. The SL of the SR header includes nodes D and G, but does not include the destination node (node 226 or Z). When SR-IPv6 packet 292d is communicated to node D (via node C), the DA is modified by node D to include the next or second node in the SL (i.e. node G), as indicated in SR-IPv6 packet 294d. When SR-IPv6 packet 294d is further communicated to the node G (via node F), the SR-IPv6 packet 294d is decapsulated by node G, which is represented by SR-IPv6 packet 296d. Here, similar to the source node, the destination node may or may not be SRv6-configured.

Note that the current state of the art for SRv6 is further described in various standards-related documents, including Internet Engineering Task Force (IETF) documents, such as "Segment Routing Architecture" identified by "draft-ietf-spring-segment-routing-14"; "IPv6 Segment Routing Header (SRH)" identified by "draft-ietf-6man-segment-routing-header-07"; and "SRv6 Network Programming" identified by "draft-filsfils-spring-srv6-network-programming-03".

Figure 3:
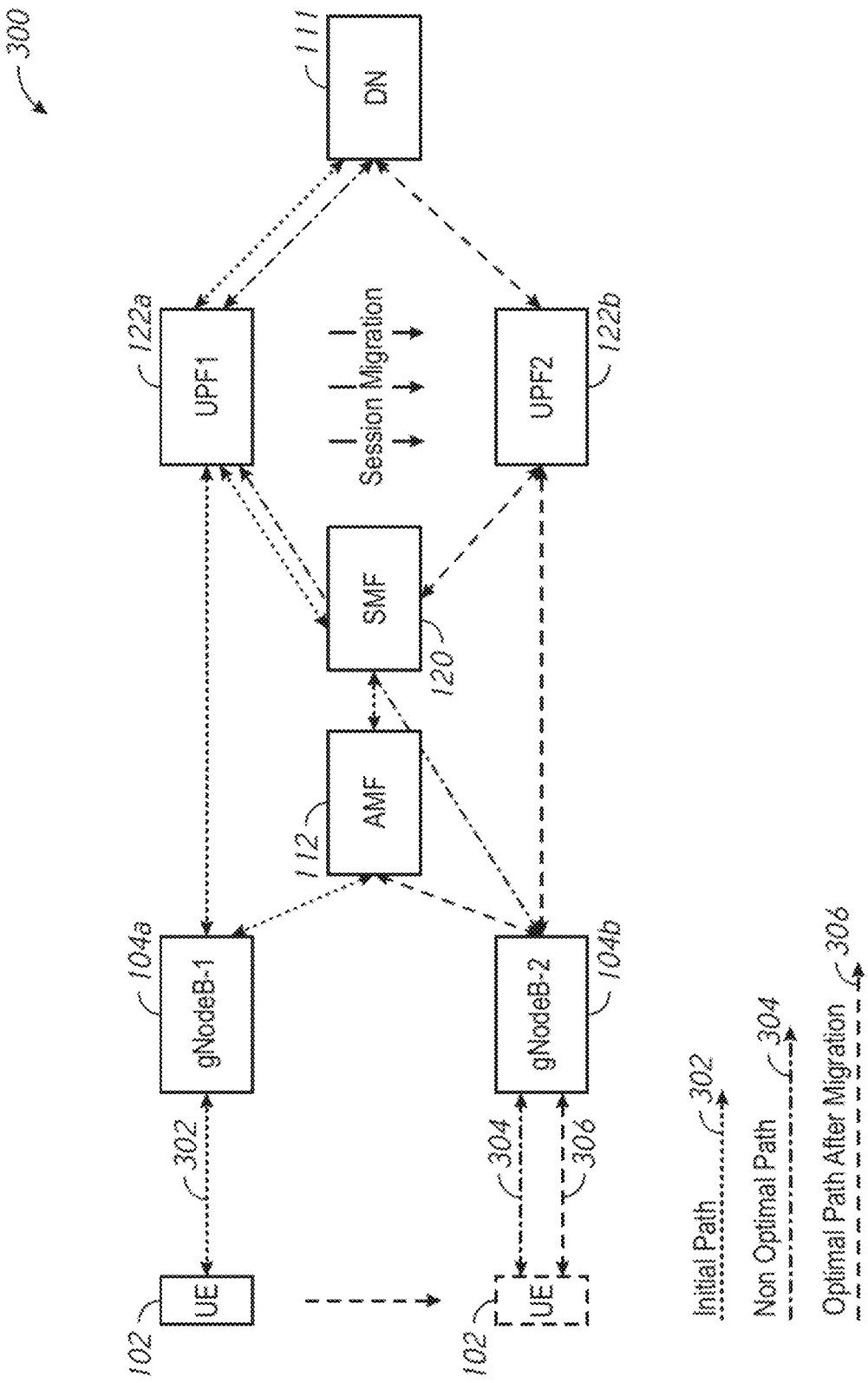
FIG. 3 is an illustrative representation of a node arrangement for describing (one particular need for) session migration for a UE based on a UE mobility event.

FIG. 3 is an illustrative representation of a node arrangement 300 for describing (one particular need for) session migration for a UE based on a UE mobility event. Initially, UE 102 is being served by a gNB1 104a and has one or more sessions for communicating data packets that are routed via a UPF1 122a. Thus, an initial path 302 for the session includes a path between gNB1 104a and UPF1 122a. When the session of the UE 102 is handover from (source) gNB1 104a to a (target) gNB2 104b, a non- or sub-optimal path 304 for the session may result, which includes a (e.g. more lengthy) path between gNB2 104b and UPF 1 122a. After session migration to a UPF 2 122b, a (more) optimal path 306 for the session may be established which includes a path between gNB2 104b and UPF 2 122b.

According to some implementations, session or flow migration for a UE may be performed according to implementation. In 5G, an SMF may insert a branching point (BP) for migrating an entire PDU session from one UPF to another UPF, or configure rules on an uplink classifier (ULCL)/BP to divert some of the flows of the PDU session from one UPF to another UPF.

Figure 4A:
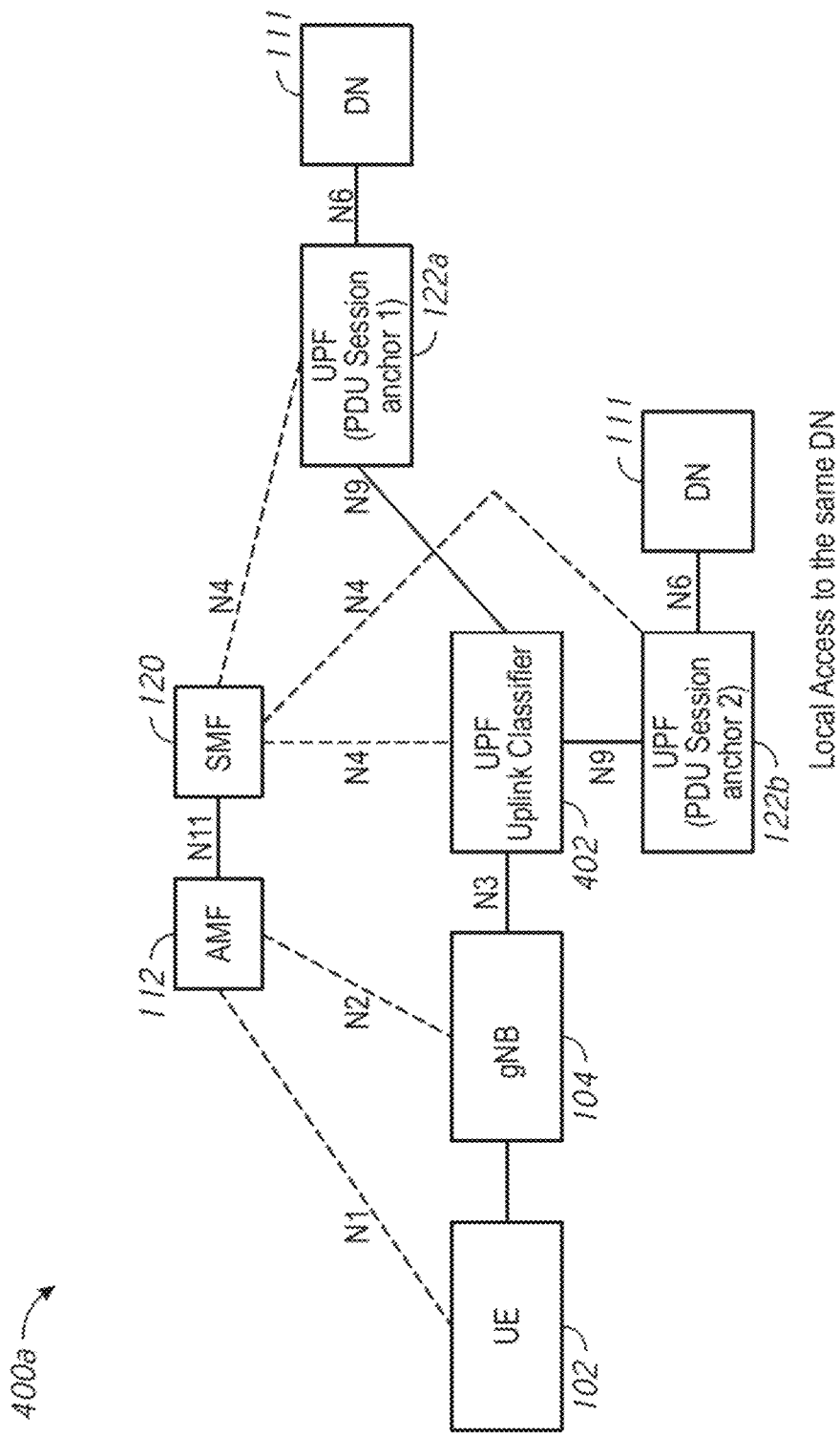
FIG. 4A is an illustrative representation of a node arrangement of a mobile network for describing use of a UPF uplink classifier.
Figure 4B:
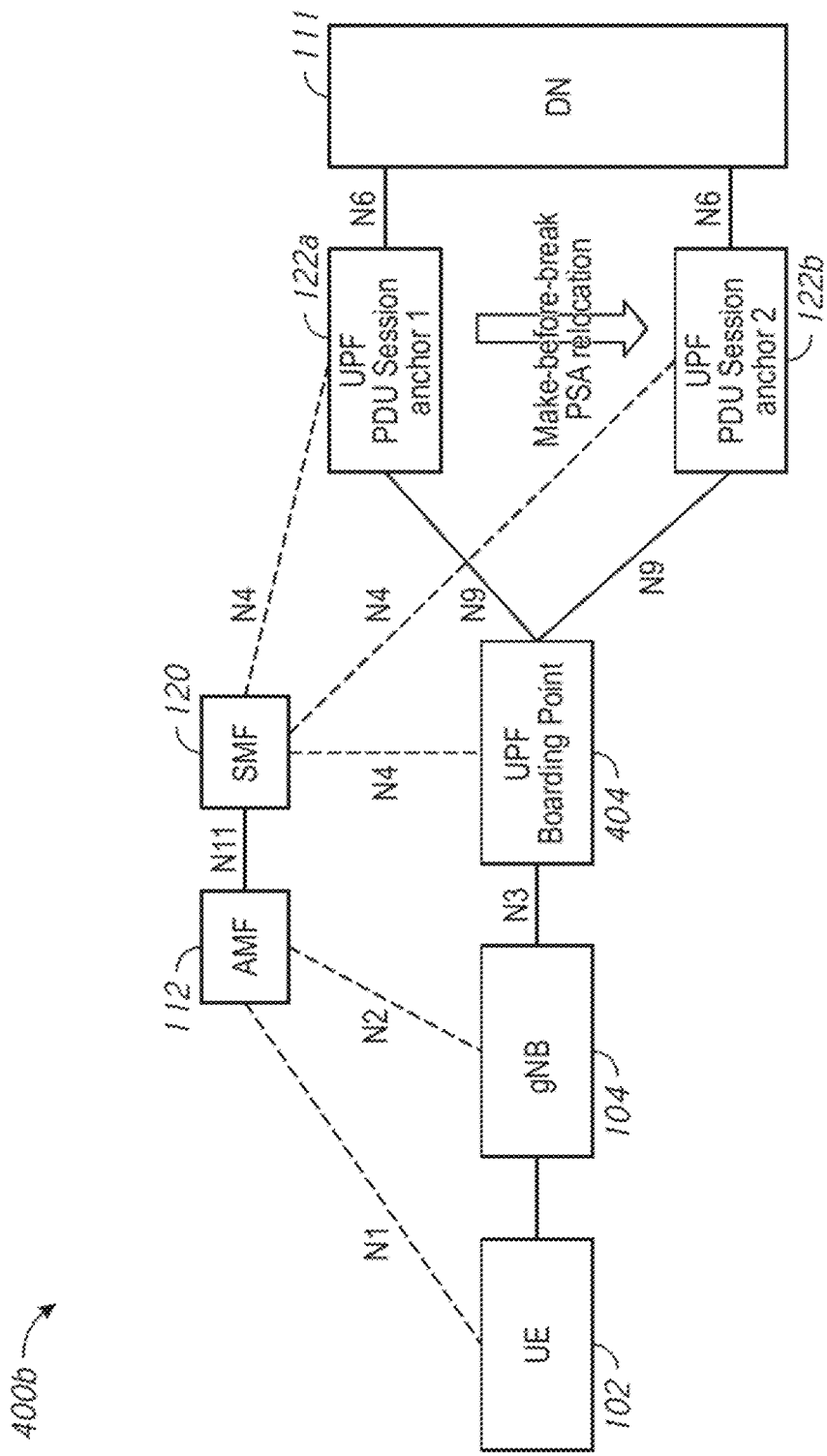
FIG. 4B is an illustration representation of a node arrangement of the mobile network for describing use of a UPF branching point.

To better illustrate, FIG. 4A is an illustrative representation of a node arrangement 400a of a mobile network for describing use of a UPF uplink classifier 402, whereas FIG. 4B is an illustration representation of a node arrangement 400b of the mobile network for describing use of a UPF branching point 404. With use of uplink classification rules at UP uplink classifier 402 in the configuration of FIG. 4A, (first) UPF 122a may be provided as a first anchor for a first PDU session of UE 102, and (second) UPF 122b may be provided as a second anchor for a second PDU session of UE 102. Here, local access to the same DN 111 may be provided. On the other hand, with use of UPF branching point 404 in the configuration of FIG. 4B, the (first) UPF 122a may be provided as a first anchor for a first PDU session of UE 102, and the (second) UPF 122b may be provided as a second anchor for a second PDU session of UE 102.

In the context of the 5G mobile network of FIGS. 1A, 1B, and 1C (as well as FIGS. 3, 4A, and 4B), there is a need to provide efficient triggering mechanisms for session or flow migration for UEs in order to (regularly) reconfigure suboptimal session paths in order to achieve communication efficiency.

According to some implementations of the present disclosure, a triggering mechanism for session or flow migration for a UE may be achieved with use of UE or BS "stamping" of metadata the header of a data packet. In some implementations, the present techniques may be achieved through use of stamping of iOAM data (e.g. iOAM TLVs) in SRHs of SRv6 data packets, for example, in the context of Internet-Draft document "Data Fields for In-situ OAM," "draft-brockners-inband-oam-data-07," Internet-Draft document "Data Fields for In-situ OAM, draft-ietf-ippm-ioam-data-04," and/or any related or succeeding documents or standards.

To better illustrate, FIGS. 5A-5C are illustrative representations of general message formats 500a, 500b, and 500c of data packets for use in SRv6 user-plane-based triggering for session or flow migration according to some implementations of the present disclosure.

In FIG. 5A, the message format 500a of the data packet includes a header 502a (e.g. an SRH) and a payload 504a which may include payload data. Header 502a may include UE- or BS-added data (i.e. data that are added to or inserted in the header 502a by the UE or BS) which may be referred to as iOAM data. More specifically in FIG. 5A, header 502a may include an identifier 520a which identifies a serving BS (e.g. eNB or gNB) of the UE. Identifier 520a may be a node ID or address of the serving BS. In some implementations, identifier 520a may be an identifier of a new target serving BS in a handover of one or more sessions of the UE. UP detection of identifier 520a that indicates a new target serving BS in a handover may be used as a trigger to perform analytics for session or flow migration for the UE.

In FIG. 5B, the message format 500b of the data packet includes a header 502b (e.g. an SRH) and a payload 504b which may include payload data. Header 502b may include UE- or BS-added data (i.e. data that are added to or inserted in the header 502b by the UE or BS) which may be referred to as iOAM data. More specifically in FIG. 5B, header 502b may include an identifier 520b of a session (e.g. a session ID) of the UE. In some implementations, UP detection of identifier 520b that indicates a new or changed session may be used as a trigger to perform analytics for session or flow migration for the UE.

In FIG. 5C, the message format 500c of the data packet includes a header 502c (e.g. an SRH) and a payload 504c which may include payload data. Header 502c may include UE- or BS-added data (i.e. data added to or inserted in the header 502c by the UE or BS) which may be referred to as iOAM data. More specifically in FIG. 5B, header 502b may include a timestamp (TS) 520c of a time of processing (sending and/or receiving) of the data packet by the UE or BS. In some implementations, the UP entity may identify timestamp 520c and include it in or use it to derive timing information. The timing information may be indicative of at least a timing of communication of the data packet between the BS and the UP entity. The timing information may be used to perform analytics for session or flow migration for the UE. For example, the timing information may include the timestamp and at least one other timestamp associated with receipt of the data packet at the UP entity, or may include a time differential between the timestamp and at least one other timestamp associated with receipt of the data packet at the UP entity.

Figure 6:
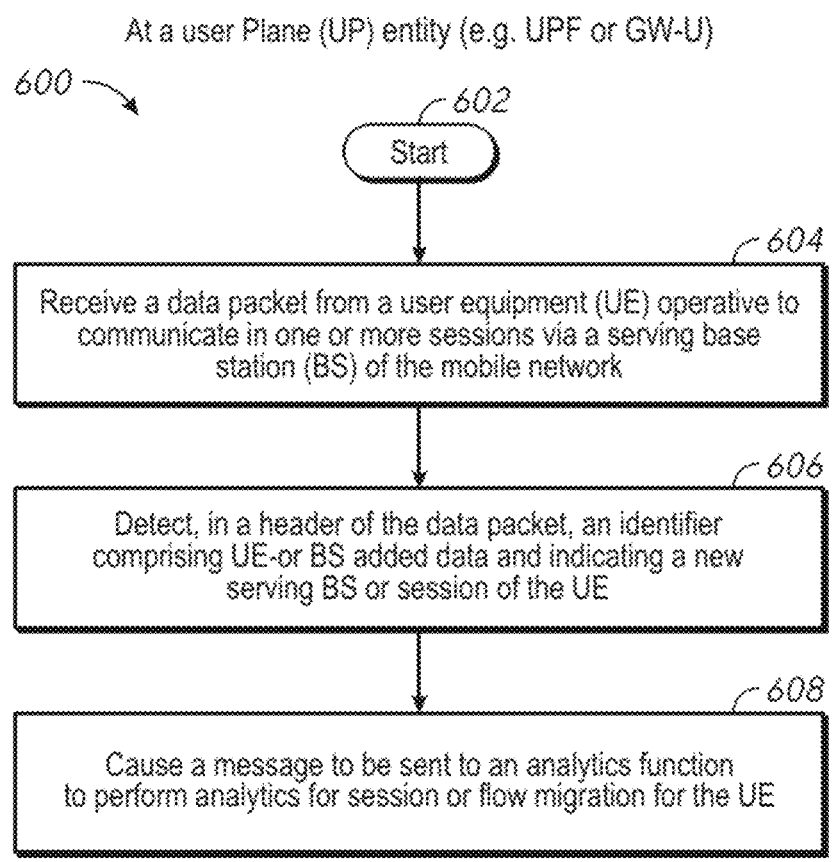
FIGS. 6 and 7A-7B are flowcharts for describing the basic steps in the SRv6 user-plane-based triggering methods for session or flow migration in mobile networks according to some implementations of the present disclosure.
Figure 7A:
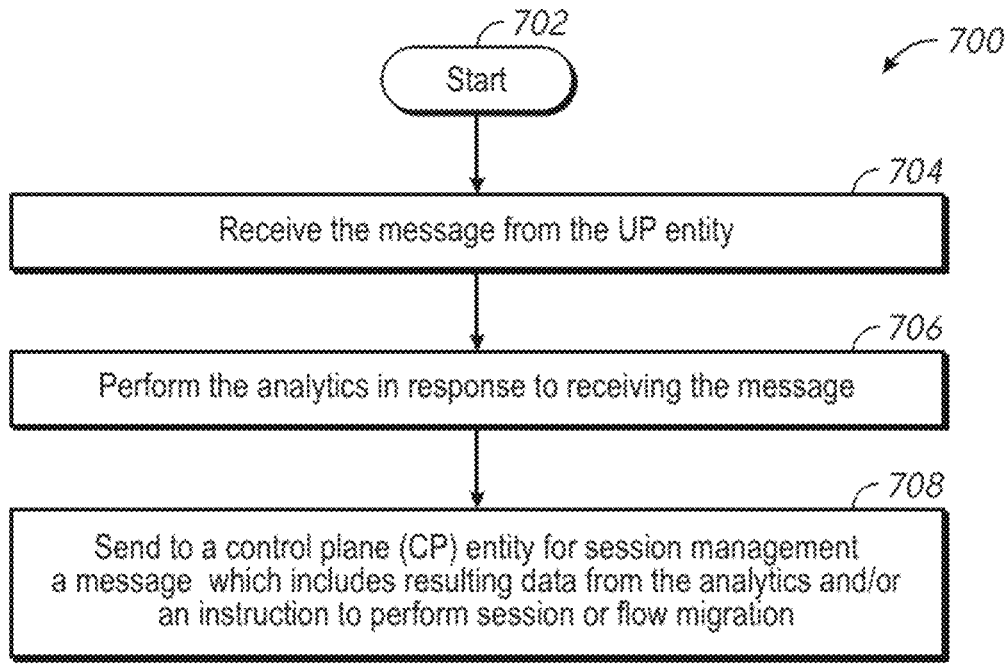
Figure 7B:
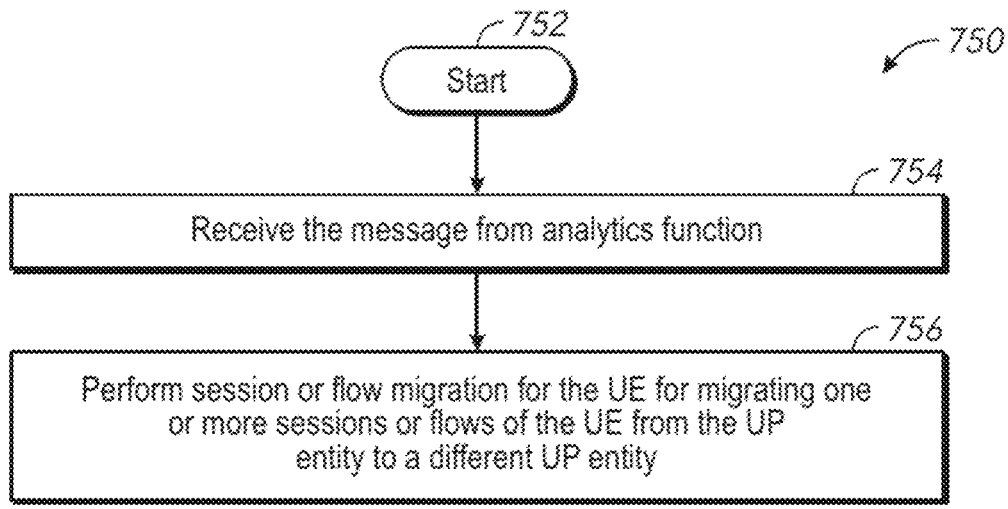

FIGS. 6 and 7A-7B are flowcharts for describing the basic steps in the SRv6 user-plane-based triggering methods for session or flow migration in mobile networks according to some implementations of the present disclosure. With respect to the methods in these flowcharts, as well as the methods in the remaining flowcharts and call flow diagrams, the particular network function or node configured to perform the techniques may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

More particularly, FIG. 6 is a flowchart 600 for describing a method which may be performed at a UP entity (e.g. a UPF or GW-U), FIG. 7A is a flowchart 700 for describing a method which may be performed at an analytics function (e.g. a NWDAF), and FIG. 7B is a flowchart 750 for describing a method which may be performed at a CP for session management (e.g. an SMF or GW-C).

Beginning at a start block 602 of FIG. 6, a UP entity for use in a mobile network may receive a data packet from a UE operative to communicate in one or more sessions via a serving BS (e.g. eNB or gNB) of the mobile network (step 604 of FIG. 6). The data packet may be an SRv6 data packet. The UP entity may detect, in a header (e.g. the SRH or TLV) of the data packet, an identifier indicating a new serving BS or session of the UE (step 606 of FIG. 6). The identifier may be UE- or B S-added data (e.g. iOAM data) that is inserted in the header by the UE. In response, the UP entity may cause a message to be sent to an analytics function (e.g. a NWDAF) to perform analytics for session or flow migration for the UE (step 608 of FIG. 6).

Continuing, beginning at a start block 702 of FIG. 7A, the analytics function may receive the message from the UP entity (step 704 of FIG. 7A), perform the analytics (step 706 of FIG. 7A) and, in response, send a message to the CP entity for session management (step 708 of FIG. 7A). The message may indicate an instruction to perform session or flow migration and/or contain resulting data from the analytics (e.g. information associated with a more suitable or optimal UP entity).

Continuing, beginning at a start block 750 of FIG. 7B, the CP entity for session management may receive the message from the analytics function (step 754 of FIG. 7B). In response to receiving the message, the CP entity for session management may perform session or flow migration of one or more sessions or flows of the UE from the UP entity to a different UP entity (step 756 of FIG. 7B).

Figure 8:
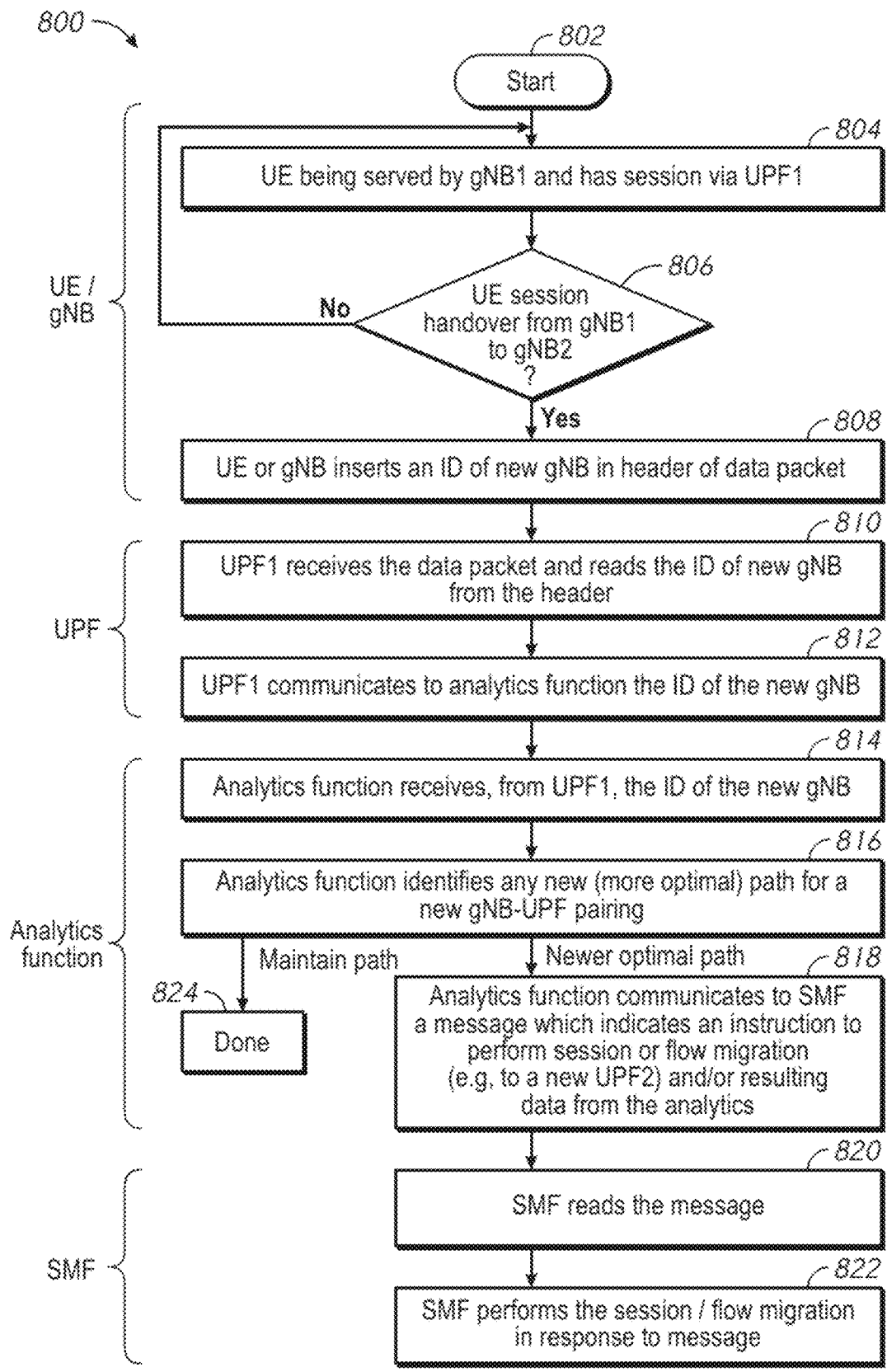
FIG. 8 is a flowchart for describing a more descriptive, end-to-end SRv6 user-plane-based triggering method for session or flow migration in mobile networks (based on a UE mobility event) according to some implementations of the present disclosure.

FIG. 8 is a flowchart 800 for describing a more descriptive, end-to-end SRv6 user-plane-based triggering method for session or flow migration in mobile networks according to some implementations of the present disclosure. The method of FIG. 8 pertains to an SRv6 user-plane-based triggering method for session or flow migration that is triggered based on a UE mobility event (e.g. handover or change in gNB). The method of FIG. 8 as described is applied specifically to a 5G mobile network and involves multiple entities of the 5G mobile network, including a gNB, a UPF, and a SMF.

Beginning at a start block 802 of FIG. 8, a UE is being served by gNB1 and has one or more sessions for communicating data packets that are routed (e.g. anchored) via UPF 1 (step 804 of FIG. 8). Thus, the route for the data packets is gNB1-UPF1. When the session of the UE is handover from gNB1 to gNB2 (as identified at step 806 of FIG. 8), this may be detected at the UE and/or gNB. The UE or gNB2 may add or insert an ID of new serving (target) gNB2 in a header of the (next) data packet (e.g. an iOAM TLV) (step 808 of FIG. 8). The ID may be an ID or address of the gNB. The data packet may be an SRv6 data packet where the header is an SRH.

UPF 1 may receive this data packet and detect or otherwise read the ID of new serving (target) gNB2 from the header (step 810 of FIG. 8). UPF 1 may communicate to the analytics function (e.g. NWDAF) a message which includes the ID of the new serving (target) gNB2 (step 812 of FIG. 8). The change in gNB (i.e. the change in mobility) may serve as a trigger to signal the analytics function to perform analytics with respect to the new gNB2-UPF 1 route.

The analytics function may receive, from UPF 1, the message which includes the ID of the new serving (target) gNB2 (step 814 of FIG. 8). The analytics function may perform analytics to determine or identify any new (more optimal) path associated with a new gNB-UPF pairing (i.e. whether session or flow of the UE should be migrated to a new UPF, such as UPF 2) (step 816 of FIG. 8). The analytics function may communicate to the SMF one or more messages which indicate an instruction to perform session or flow migration for the UE and/or contain resulting data from the analytics (e.g. information associated with a more suitable or optimal UPF 2) (step 818 of FIG. 8). The SMF may receive the one or more messages (step 820 of FIG. 8) and, in response to the message, perform session or flow migration for the UE to a different UPF (e.g. UPF 2) (step 822 of FIG. 8).

In some alternative implementations of FIG. 8, the UPF 1 may communicate the one or more messages to an application function (AF) instead of the analytics function, so that the AF may (determine whether to) request and receive the resulting data from the analytics performed by the analytics function. Here, the AF may subsequently (determine whether to) send to the SMF the one or more message to indicate an instruction and/or contain the resulting data from the analytics. In other alterative implementations of FIG. 8, the UPF 1 may communicate the one or more messages to the SMF instead of the analytics function, so that the SMF may (determine whether to) request and receive from the analytics function the resulting data from the analytics.

Figure 9:
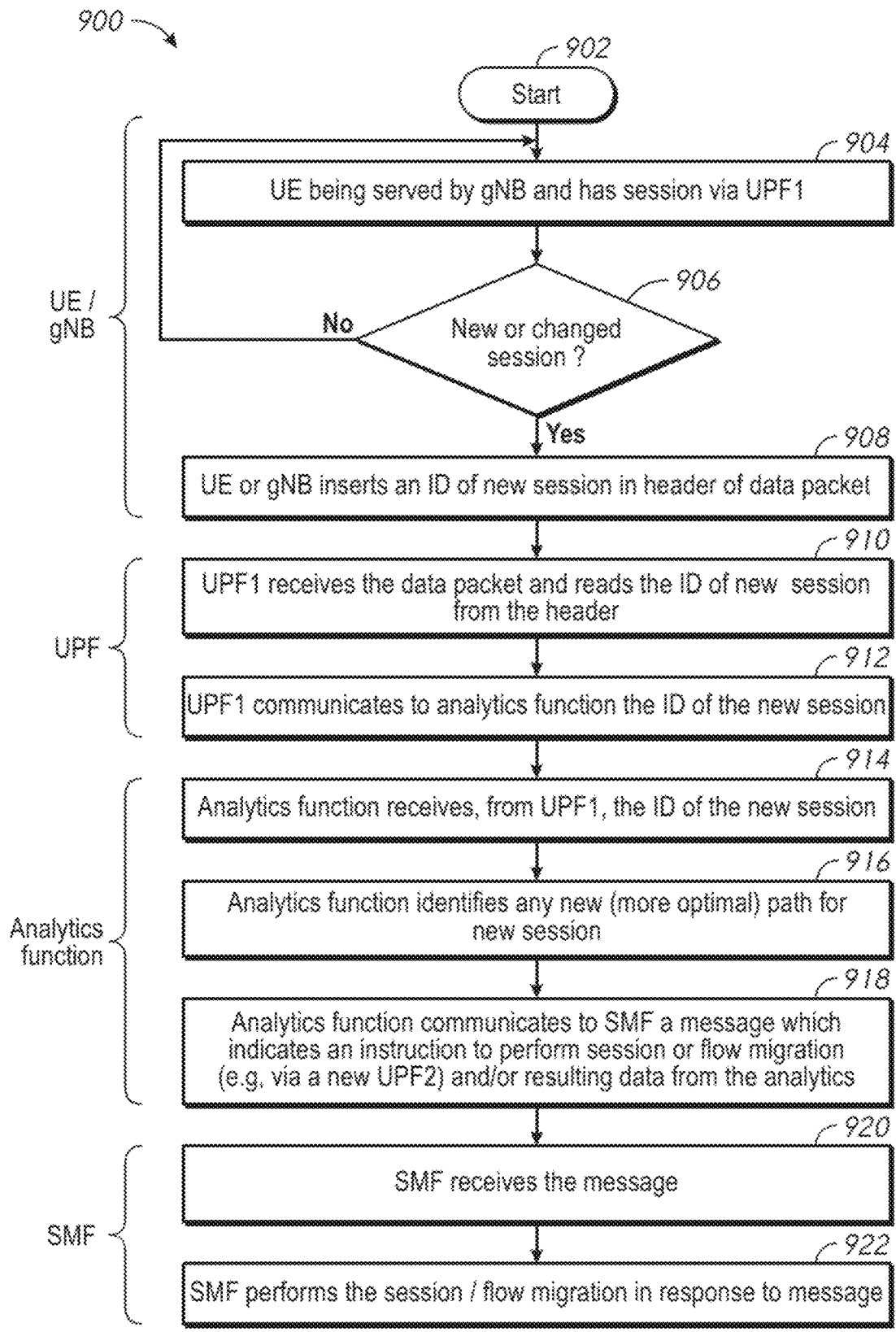
FIG. 9 is a flowchart for describing another more descriptive, end-to-end SRv6 user-plane-based triggering method for session or flow migration in mobile networks (based on new or changed session) according to some implementations of the present disclosure.

FIG. 9 is a flowchart 900 for describing another more descriptive, end-to-end SRv6 user-plane-based triggering method for session or flow migration in mobile networks according to some implementations of the present disclosure. The method of FIG. 9 pertains to an SRv6 user-plane-based triggering method for session or flow migration that is triggered based on a new or changed session of the UE for communicating data packets. The method of FIG. 9 as described is applied specifically to a 5G mobile network and involves multiple entities of the 5G mobile network, including a gNB, a UPF, and a SMF.

Beginning at a start block 902 of FIG. 9, a UE is being served by a gNB and has one or more sessions for communicating data packets that are routed (e.g. anchored) via UPF 1 (step 904 of FIG. 9). When there is a new or changed session for the UE (as identified at step 906 of FIG. 9), this may be detected at the UE and/or gNB. Here, the UE or gNB may add or insert a session ID of the new session in a header of the (next) data packet (e.g. an iOAM TLV) (step 908 of FIG. 9). The data packet may be an SRv6 data packet where the header is an SRH. Alternatively, in step 908, when a session has changed (e.g. a session is ended or terminated), the UE or gNB may add or insert a session ID of the ended session (e.g. or identity only the remaining sessions) in the header of the (next) data packet.

UPF 1 may receive this data packet and detect or otherwise read the session ID of the new session from the header (step 910 of FIG. 9). UPF 1 may communicate to the analytics function (e.g. NWDAF) a message which includes the session ID of the new session (step 912 of FIG. 9). The change in session may serve as a trigger to signal the analytics function to perform analytics with respect to new or changed requirements associated with the session(s).

The analytics function may receive, from UPF 1, the message which includes the session ID of the session (step 914 of FIG. 9). The analytics function may perform analytics to determine or identify any new (more optimal) path associated with new or changed session (i.e. whether any flows or sessions of the UE should be migrated to a new UPF, such as UPF 2) (step 916 of FIG. 9). The analytics function may communicate to the SMF one or more messages which indicate an instruction to perform session or flow migration for the UE and/or contain resulting data from the analytics (e.g. information associated with a more suitable or optimal UPF 2) (step 918 of FIG. 9). The SMF may receive the one or more messages (step 920 of FIG. 9) and, in response to the message, perform session or flow migration for the UE to a different UPF (e.g. UPF 2) (step 922 of FIG. 9).

In some alternative implementations of FIG. 9, the UPF 1 may communicate the one or more messages to an AF instead of the analytics function, so that the AF may (determine whether to) request and receive the resulting data from the analytics performed by the analytics function. Here, the AF may subsequently (determine whether to) send to the SMF the one or more messages to indicate an instruction and/or contain the resulting data from the analytics. In other alterative implementations of FIG. 9, the UPF 1 may communicate the one or more messages to the SMF instead of the analytics function, so that the SMF may (determine whether to) request and receive from the analytics function the resulting data from the analytics.

Some implementations associated with FIGS. 6, 7A-7B, 8, and 9 may be provided in the context of that shown and described in relation to FIGS. 4A-4B. Here, session or flow migration may be performed by the CP entity for session management (e.g. SMF or GW-C) by migrating the entire session to a different UP entity, by migrating some or all of the flows by configuring an uplink classifier or branching point, or by inserting a branching point and migrating the entire session to a different UP entity.

Also, some implementations associated with FIGS. 6, 7A-7B, 8, and 9 may make specific use of SRv6 and data fields associated with In-situ OAM. Here, in some implementations, the iOAM "Trace Type" may be set with Bit 0 (hop_num) and node_id) and the packet forwarded; each eNB/gNB and other nodes may insert its node_id and hop_num until it the packet reaches the UPF. In other implementations, the next header (NH) details (e.g. eNB address) may be obtained and included in the SRv6 TLV. The former implementation may provide satisfactory operation when most or all nodes understand and insert the iOAM details; the latter may provide satisfactory operation when the UE is able and configured to fetch the address of the eNB/gNB.

Also, as described in relation to FIGS. 6, 7A-7B, 8, and 9, an event which is a handover and/or a newly-added session may be used as part of the triggering mechanism in the technique. In some implementations, the one or more events may be or include one or more network-configurable events associated with the UE.

Moving ahead, it has been observed that many communication issues arise as a result of a performance and/or timing issues, for example, delay or jitter. According to some implementations, a triggering mechanism for session or flow migration for a UE may be based on the detection of a performance degradation (e.g. delay, jitter, etc.), and include the use of UE or base station "stamping" of timestamp data in the header of an SRv6 data packet.

Figure 10:
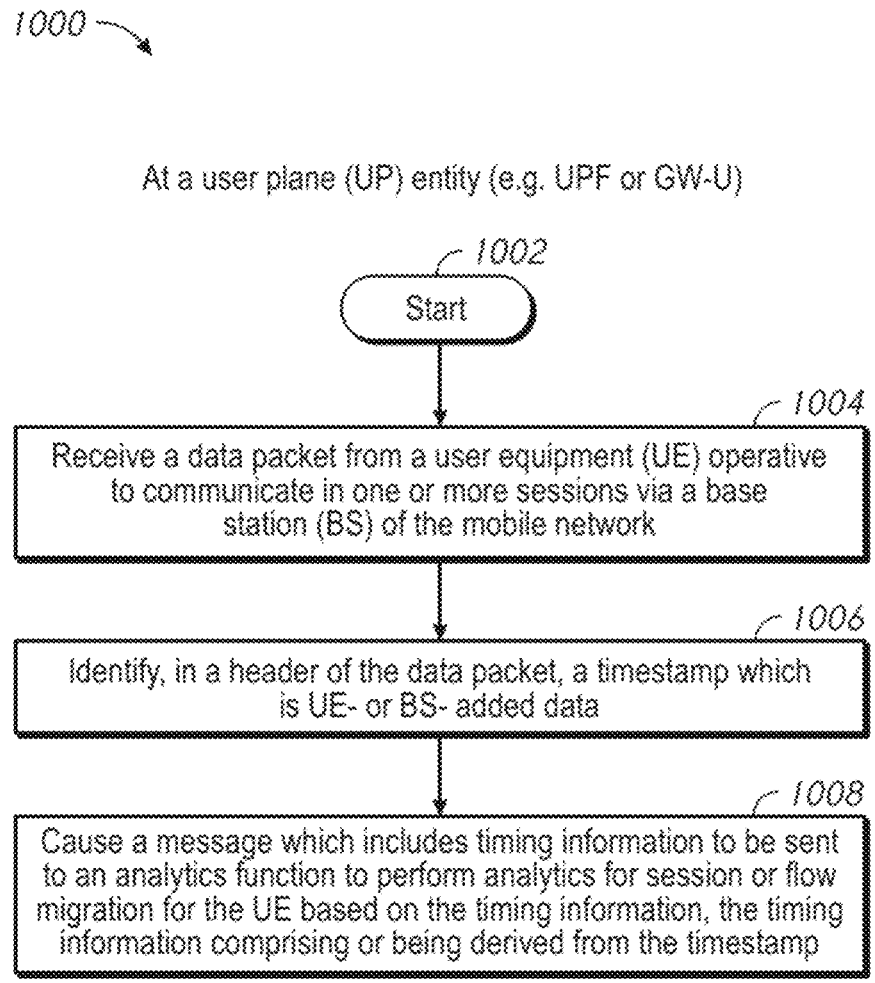
FIGS. 10 and 11A-11B are flowcharts for describing the basic steps in the SRv6 user-plane-based triggering methods for session or flow migration in mobile networks according to some implementations of the present disclosure.
Figure 11A:
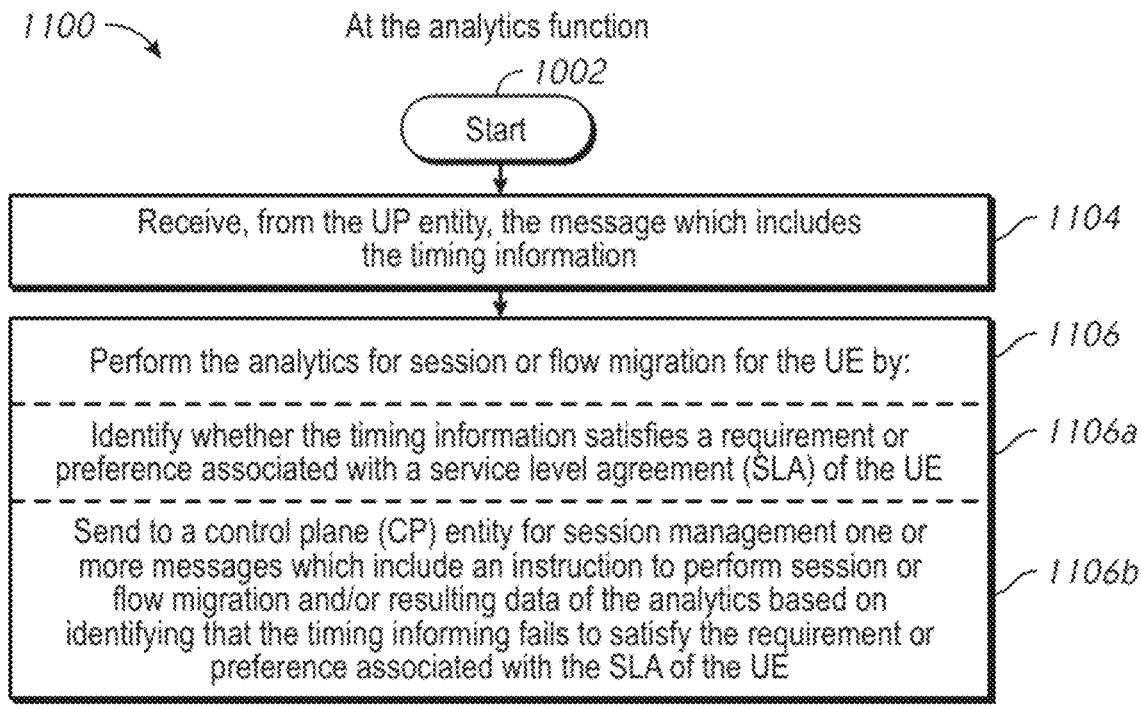
Figure 11B:
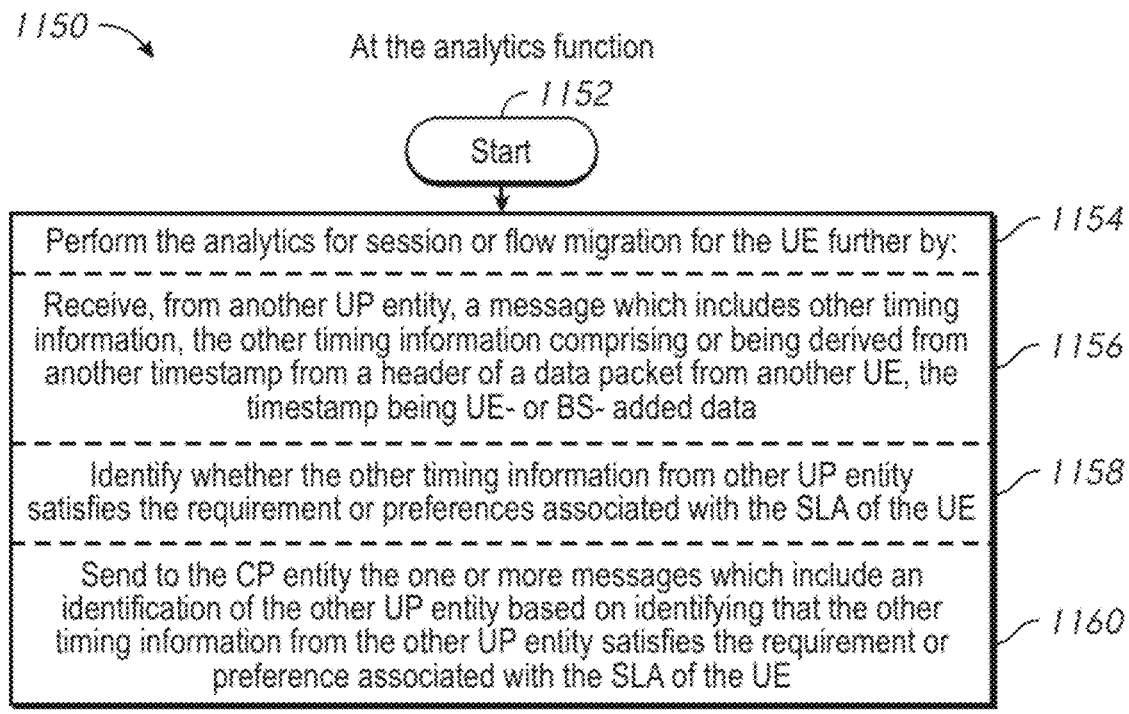

To better illustrate, FIGS. 10 and 11A-11B are flowcharts for describing the basic steps in the SRv6 user-plane-based triggering methods for session or flow migration in mobile networks according to some implementations of the present disclosure. More particularly, FIG. 10 is a flowchart 1000 for describing a method which may be performed at a UP entity (e.g. a UPF or GW-U), FIG. 11A is a flowchart 1100 for describing a method which may be performed at an analytics function (e.g. a NWDAF), and FIG. 11B is a flowchart 1150 for describing a method which also may be performed at the analytics function.

Beginning at a start block 1002 of FIG. 10, a UP entity for use in a mobile network may receive a data packet from a UE operative to communicate in one or more sessions via a serving BS (e.g. eNB or gNB) of the mobile network (step 1104 of FIG. 10). The data packet may be an SRv6 data packet. The UP entity may identify a timestamp in a header (e.g. SRH) of the data packet (step 1006 of FIG. 10). The timestamp may be UE- or BS-added data (e.g. iOAM data) that is inserted in the header by the UE or the BS. The UP entity may cause a message which includes timing information to be sent to an analytics function to perform analytics for session or flow migration for the UE based on the timing information (step 1008 of FIG. 10).

The timing information may be indicative of at least a timing of communication of the data packet between the BS and the UP entity, and may include or be derived from the timestamp. For example, the timing information may include the timestamp and at least one other timestamp associated with receipt of the data packet at the UP entity, or may include a time differential between the timestamp and at least one other timestamp associated with receipt of the data packet at the UP entity.

Continuing with the flowchart 1100 of FIG. 11A, the analytics function may receive, from the UP entity, the message which includes the timing information (step 1104 of FIG. 11A). In response, the analytics function may perform the analytics for session or flow migration for the UE (step 1106 of FIG. 11A). The analytics may include identifying whether the timing information satisfies a requirement or preference associated with a service level agreement (SLA) or profile of the UE (step 1106A of FIG. 11A). SLA or profile information may be obtained from a policy server (e.g. a PCF). Based on identifying that the timing information fails to satisfy the requirement or preference associated with the SLA or profile of the UE, the analytics function may send to the CP entity for session management one or more messages which may indicate an instruction to perform session or flow migration and/or contain resulting data of the analytics (e.g. information associated with a more suitable or optimal UP entity) (step 1106B of FIG. 11A).

Continuing with the flowchart 1150 of FIG. 11B, the analytics function may perform the analytics further by implementing the following (step 1154 of FIG. 11B). The analytics function may receive, from a different UP entity, a message which includes other timing information (step 1156 of FIG. 11B). The other timing information may be indicative of at least another timing of communication of a data packet between the BS and the different UP entity, and may include or be derived at least in part from another (UE- or B S-added) timestamp. The analytics function may identify whether the other timing information from the other UP entity (i.e. the other BS-UP entity pairing) satisfies the requirement or preference associated with the SLA or profile of the UE (step 1158 of FIG. 11B). The SLA or profile may be obtained from a policy server (e.g. a PCF). Based on identifying that the other timing information from the different UP entity satisfies the requirement or preference associated with the SLA of the UE, the analytics function may send to the CP entity for session management the one or more messages which include an identification of the different UP entity and/or associated information (step 1160 of FIG. 11B). Although steps 1156-1158 are described as being performed in relation to a single additional UE, these steps may be performed for each one of a plurality of additional UEs in actual practice, so as to identify a more (e.g. most) suitable or optimal communication path and/or UP entity for the UE.

Figure 12:
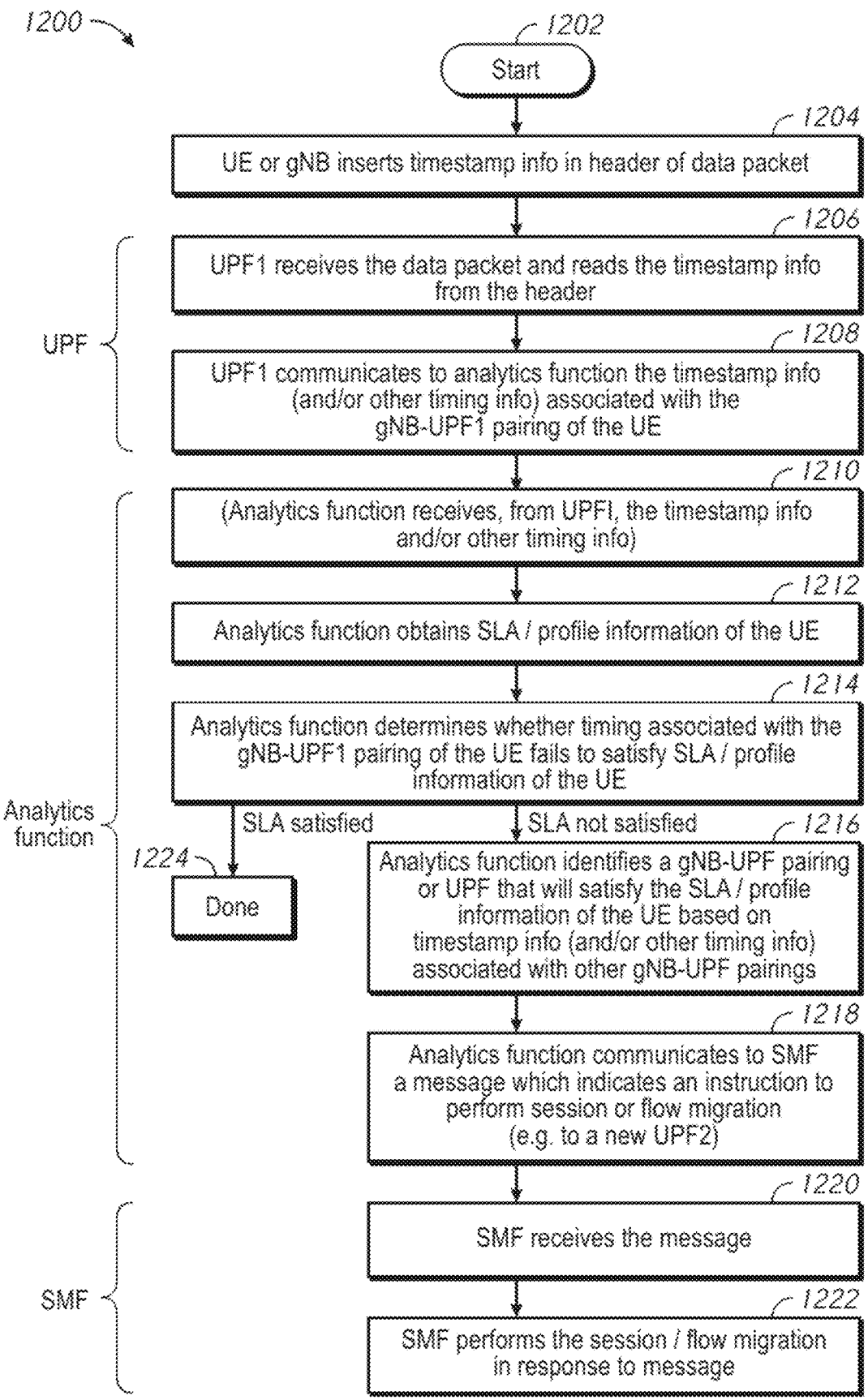
FIG. 12 is a flowchart for describing yet another more descriptive, end-to-end SRv6 user-plane-based triggering method for session or flow migration in mobile networks (based on a UE mobility event) according to some implementations of the present disclosure.

FIG. 12 is a flowchart 1200 for describing yet another more descriptive, end-to-end SRv6 user-plane-based triggering method for session or flow migration in mobile networks according to some implementations of the present disclosure. The method of FIG. 12 pertains to an SRv6 user-plane-based triggering method for session or flow migration that is triggered based on a UE mobility event (e.g. handover or change in gNB). The method of FIG. 12 as described is applied specifically to a 5G mobile network and involves multiple entities of the 5G mobile network, including a gNB, a UPF, and a SMF.

Beginning at a start block 1202 of FIG. 12, a UE is being served by a gNB and has one or more sessions for communicating data packets that are routed (e.g. anchored) via UPF 1. The UE or gNB may insert a timestamp in a header of data packet (step 1204 of FIG. 12). The data packet may be an SRv6 data packet where the header is an SRH. The UPF 1 may receive the data packet and read the timestamp from the header (step 1206 of FIG. 12). The UPF 1 may communicate to the analytics function a message which includes the timestamp (step 1208 of FIG. 12).

More generally, the message in step 1208 may include timing information that is indicative of at least a timing of communication of the data packet between the gNB and the UP entity, and may include or be derived from the timestamp. For example, the timing information may include the timestamp and at least one other timestamp associated with receipt of the data packet at the UP entity, or may include a time differential between the timestamp and at least one other timestamp associated with receipt of the data packet at the UP entity.

The analytics function may receive, from the UPF 1, the timing information (step 1210 of FIG. 12). The analytics function may obtain an SLA or profile information associated with the UE (step 1212 of FIG. 12). The SLA or profile may be obtained from a policy server (e.g. a PCF). The analytics function may determine whether the timing associated with the gNB-UPF 1 pairing of the UE fails to satisfy the SLA or profile information (e.g. a requirement or preference) associated with the UE (step 1214 of FIG. 12). If the timing associated with the gNB-UPF 1 pairing satisfies the SLA or profile information (e.g. the requirement or preference) as determined at step 1214, then the assessment is done (step 1224 of FIG. 12), but the technique may continue (regularly) repeated at step 1204.

If the timing associated with the gNB-UPF 1 pairing fails to satisfy the SLA or profile information (e.g. the requirement or preference) as determined at step 1214, then session or flow migration for the UE may be performed. Here, the analytics function may identify a gNB-UPF pairing or UPF that will satisfy the SLA or profile information based on timing information associated with other gNB-UPF pairings (step 1216 of FIG. 12). The analytics function may send to the CP entity for session management one or more messages which may indicate an instruction to perform session or flow migration and/or contain resulting data of the analytics and/or (step 1218 of FIG. 12). The SMF may receive the message (step 1220 of FIG. 12) and perform the session or flow migration in response (e.g. to a newly-identified UPF) (step 1222 of FIG. 12).

Figure 13:
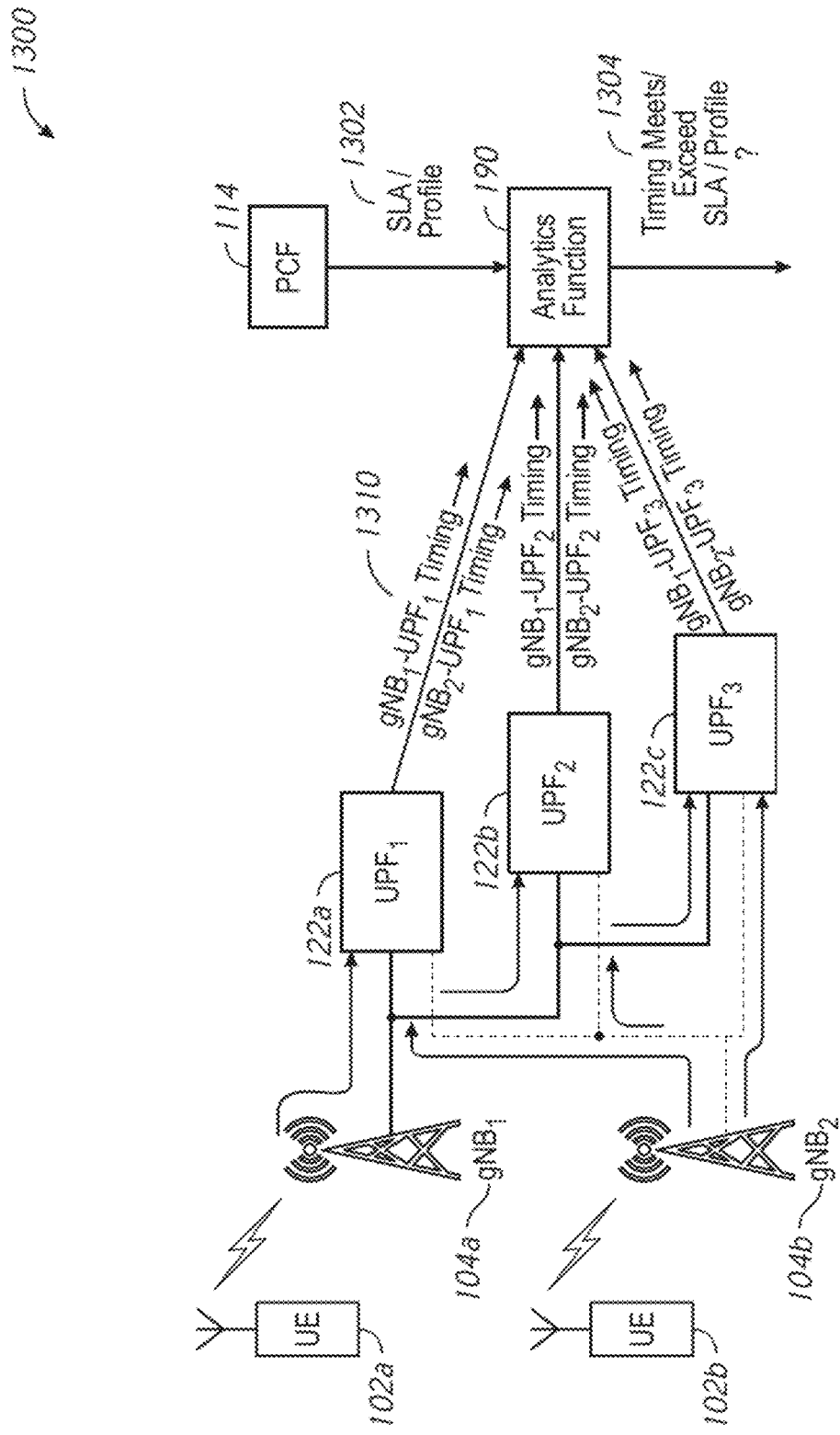
FIG. 13 is an illustrative representation of a mobility node arrangement for illustrating a portion of the methods associated with FIGS. 10, 11A-11B, and 12.

FIG. 13 is an illustrative representation of a mobility node arrangement 1300 for illustrating a portion of the methods associated with FIGS. 10, 11A-11B, and 12. In FIG. 13, two gNBs 104a and 104b and three UPFs 122a, 122b, and 122c are shown, and various different gNB-UPF paths may be established therebetween. UE 102a may be served by gNB 104a and have one or more sessions for communication of data packets routed via UPF 1 122a. Timestamps of the UE 102a or gNB1 104a and the UPF 1 122a may be used to deriving timing information and a timing therebetween.

In FIG. 13, analytics function 190 may obtain, from PCF 114, an SLA or profile information 1302 for UE 102a. Here, analytics function 190 may use the Nb interface to obtain the SLA constraints information, which may be class-based, QoS marking-based, SRv6 color-based, etc. Analytics function 190 may perform analytics to provide a determination 1304 of whether the gNB1-UPF1 timing (e.g. derived from timestamps) satisfies (e.g. meets or exceeds) a requirement or preference of the SLA or profile information 1302. Note that many communication issues may result of a timing issue, for example, delay or jitter. If the timing fails to satisfy the requirement or preference as identified by analytics function 190, session or flow migration for UE 102a (e.g. to UPF 2 122b or UPF 3 122c) may be performed. For example, analytics function 190 may send to the SMF a message which may indicate an instruction to perform session or flow migration and/or contain resulting data from the analytics.

More specifically, analytics function 190 may perform analytics to provide a determination of whether a gNB1-UPF2 timing or a gNB1-UPF3 timing (e.g. derived from timestamps) satisfies (e.g. meets or exceeds) the requirement or preference of the SLA or profile information 1302 for UE 102a. Analytics function 190 may select or identity either UPF 2 122b or UPF 3 122c as a preferred UPF for session or flow migration of UE 102a based on determining the associated timing satisfies the requirement or preference of the SLA or profile information 1302 for UE 102a. Here, analytics function 190 may send to the SMF a message which may indicate an instruction to perform session or flow migration and/or contain resulting data from the analytics (e.g. information associated with a more suitable or optimal UPF, i.e. UPF 2 122b based on gNB1-UPF 2 timing or UPF3 122c based on gNB1-UPF3 timing).

Some implementations associated with FIGS. 10, 11A-11B, 12, and 13 may be provided in the context of that shown and described in relation to FIGS. 4A-4B. Here, session or flow migration may be performed by the CP entity for session management (e.g. SMF or GW-C) by migrating the entire session to a different UP entity, by migrating some or all of the flows by configuring an uplink classifier or branching point, or by inserting a branching point and migrating the entire session to a different UP entity.

Also, some implementations associated with FIGS. 10, 11A-11B, 12, and 13 may make specific use of SRv6 and data fields associated with In-situ OAM. Here, in some implementations, each BS or gNB may be instructed to "punch" the timestamp of the data packet, using "Trace Type" set to relevant bits depending on the SLA constraints (e.g. bits 2 and 3 for delay/jitter measurement). In other implementations, each BS or gNB may be programmed with a (domain-wide unique) Segment ID (SID) which may be referred to as a timestamp SID (tsSID). For example, the semantic associated with the tsSID may be as follows:

---
IF match (SID==tsSID),
Insert timestamp in SRv6 TLV
POP and FORWARD
---

The latter option may be preferred and utilized when the UE is capable and configured to forward SRv6 packets.

Figure 14A:
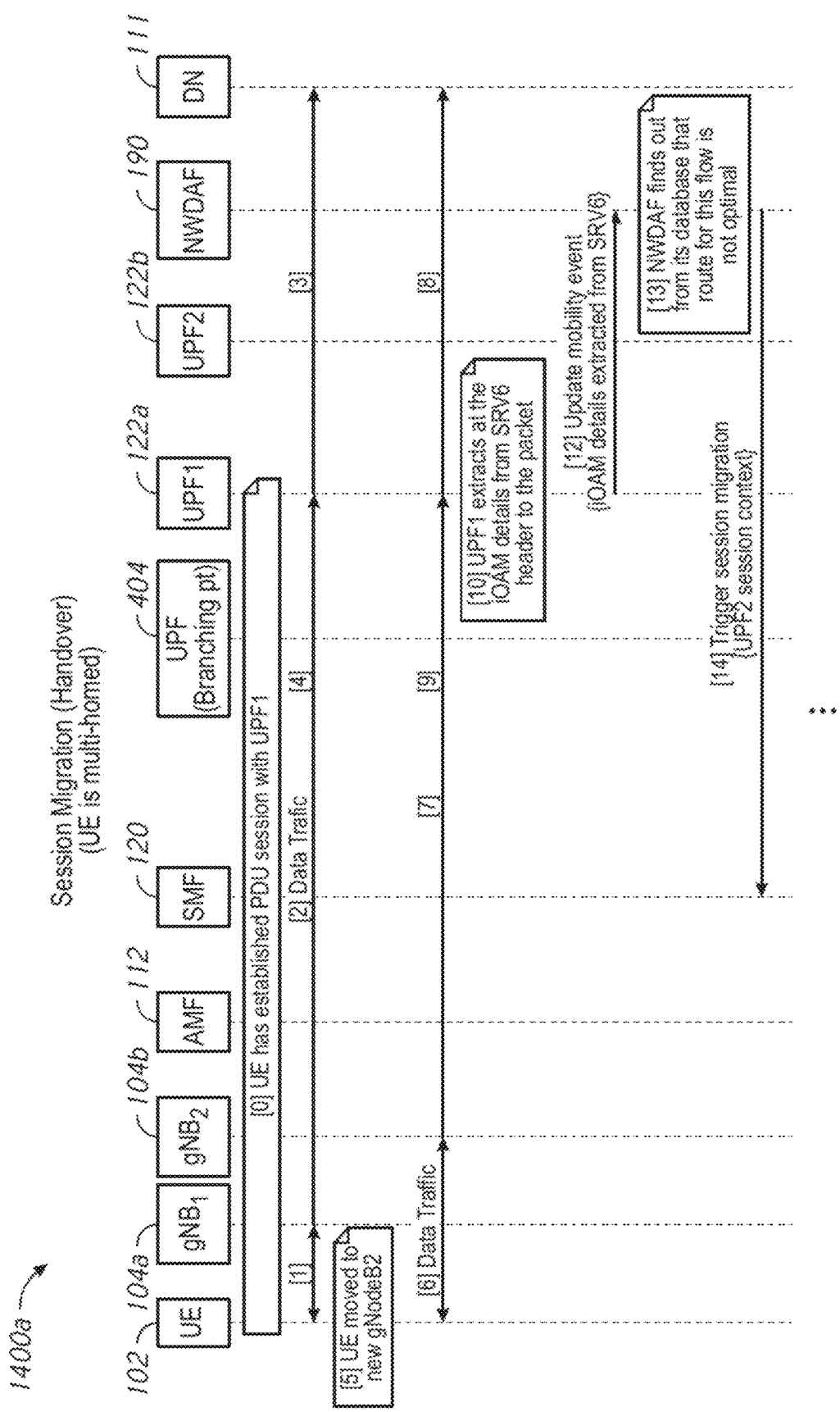
FIGS. 14A-14B form a call flow diagram for describing an end-to-end, SRv6 user-plane-based triggering method for session migration in a mobile network, where the UE is multi-homed.
Figure 14B:
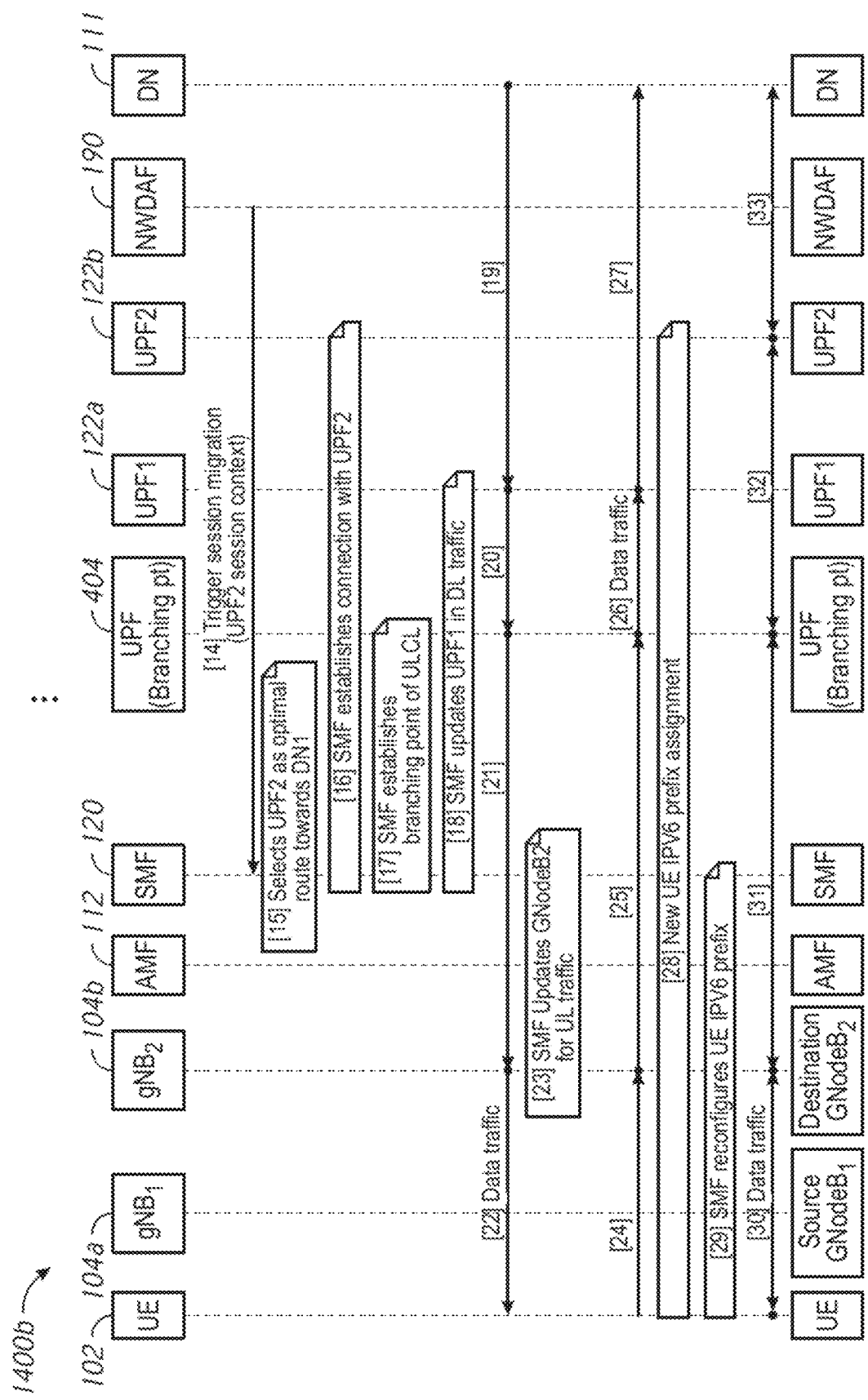

FIGS. 14A-14B form a call flow diagram 1400a/1400b for describing an end-to-end, SRv6 user-plane-based triggering method for session migration in a mobile network, where the UE may be multi-homed. In FIG. 14A, UE 102 may be served by gNB1 104a and establish a PDU session with UPF 1 122a (step 0 of FIG. 14A). SRv6 data packets are communicated in the PDU session of UE 102 between the indicator points as shown (see indicator points 1, 2, 3, and 4 of FIG. 14A). UE 102 is moved to an area of a new gNB (e.g. gNB2 104b); therefore, the PDU session of the UE 102 may be handover from (source) gNB1 104a to a (target) gNB2 104b (step 5 of FIG. 14A). A sub-optimal path for the PDU session may result, which may include a (e.g. more lengthy) path between gNB2 104b and UPF 1 122a. SRv6 data packets may now be communicated in the PDU session of UE 102 between the indicator points as shown (see indicator points 6, 7, 8, and 9 of FIG. 14A).

In the handover, the UE 102 or gNB2 104b may add or insert an ID of the new serving (target) gNB2 104b in a header of a SRv6 data packet as iOAM data (e.g. an iOAM TLV). Upon receipt of the data packet, UPF 1 122a may extract (or otherwise read, identify, or detect) the iOAM details (i.e. the ID of the BS) from the header (step 10 of FIG. 14A). UPF 1 122a may send a message which includes the iOAM details to the NWDAF 190 (step 12 of FIG. 14A). In response, NWDAF 190 may perform analytics for session or flow migration for the UE 102. Here, NWDAF 190 may consult a database or otherwise determine whether the route for the session/flow is less than optimal (step 13 of FIG. 14A). If so, the NWDAF 190 may send to SMF 120 a message which indicates an instruction for session or flow migration for the UE 102 and/or contains resulting data from the analytics (step 14 of FIG. 14A). Here, in particular, NWDAF 190 may send an identification of UPF 2 122b and data corresponding to the session context.

Continuing in FIG. 14B, SMF 120 may receive the message from NWDAF 190 and select UPF 2 122b as a (e.g. more suitable or optimal) route to DN 111 (step 15 of FIG. 14B). SMF 120 may then establish a connection with UPF 2 122b (step 16 of FIG. 14B). SMF 120 may then establish a BP/UPCL with a UPF BP (step 17 of FIG. 14B). SMF 120 may update the UPF 1 122a for downlink traffic to the UE 102 (step 18 of FIG. 14B) which is illustrated with indicator points as shown (see indicator points 19, 20, 21, and 22 of FIG. 14B). SMF 120 may update the gNB2 104b for uplink traffic to the UE 102 (step 23 of FIG. 14B) which is illustrated with indicator points as shown (see indicator points 24, 25, 26, and 27 of FIG. 14B). Given the new UPF 2 122b, a new IPv6 prefix may be assigned to the UE 102 (step 28 of FIG. 14B). SMF 120 may then reconfigure the IPv6 prefix for the UE 102 (step 29 of FIG. 14B). SRv6 data packets may now be communicated in the PDU session of UE 102 between the indicator points as shown (see indicator points 30, 31, 32, 33 of FIG. 14B).

Figure 15:
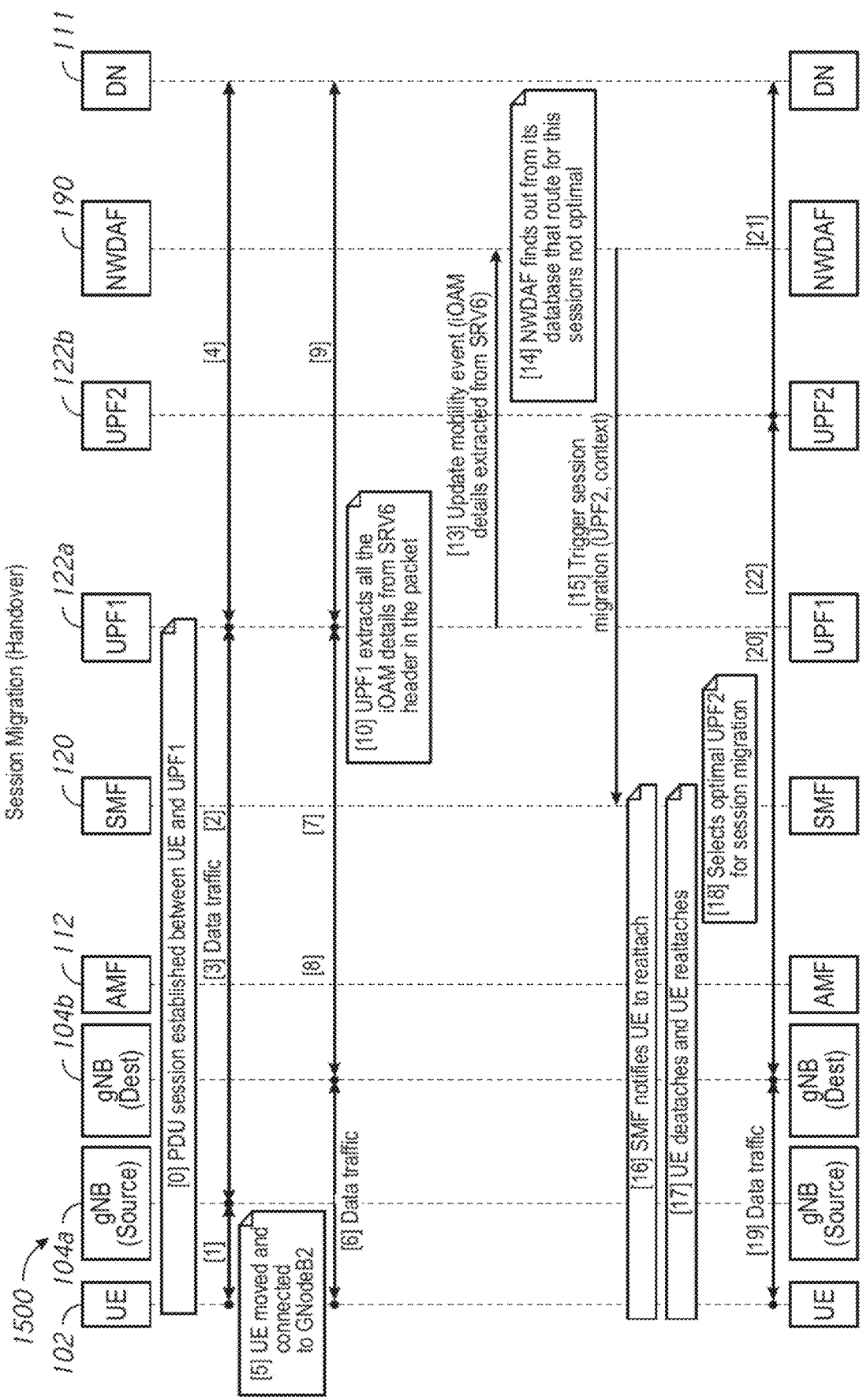
FIG. 15 is a call flow diagram for describing an end-to-end, SRv6 user-plane-based triggering method for session migration in a mobile network, where the trigger is a mobility event (e.g. UE handover)

FIG. 15 is a call flow diagram 1500 for describing an end-to-end, SRv6 user-plane-based triggering method for session migration in a mobile network, where the trigger is a mobility event (e.g. UE handover). In FIG. 15, UE 102 may be served by gNB1 104a and establish a PDU session with UPF 1 122a (step 0 of FIG. 15). SRv6 data packets are communicated in the PDU session of UE 102 between the indicator points as shown (see indicator points 1, 2, 3, and 4 of FIG. 15). UE 102 is moved to an area of a new gNB (e.g. gNB2 104b); therefore, the PDU session of the UE 102 may be handover from (source) gNB1 104a to a (target) gNB2 104b (step 5 of FIG. 15). A sub-optimal path for the PDU session may result, which may include a (e.g. more lengthy) path between gNB2 104b and UPF 1 122a. SRv6 data packets may now be communicated in the PDU session of UE 102 between the indicator points as shown (see indicator points 6, 7, 8, and 9 of FIG. 15).

In the handover, the UE 102 or gNB2 104b may add or insert an ID of the new serving (target) gNB2 104b in a header of a SRv6 data packet, as iOAM data. Upon receipt of the data packet, UPF 1 122a may extract (or otherwise read, identify, or detect) the iOAM details (i.e. the ID of the BS) from the header (step 10 of FIG. 15). UPF 1 122a may send a message which includes the iOAM details to the NWDAF 190 (step 13 of FIG. 15). In response, NWDAF 190 may perform analytics for session or flow migration for the UE 102. Here, NWDAF 190 may consult a database or otherwise determine whether the route for the session/flow is less than optimal (step 14 of FIG. 15).

If so, the NWDAF 190 may send to SMF 120 a message which indicates an instruction for session or flow migration for the UE 102 and/or contains resulting data from the analytics (step 15 of FIG. 15). Here, in particular, NWDAF 190 may send an identification of UPF 2 122b and data corresponding to the session context. In response, SMF 120 may perform session migration for the UE 102. Here, SMF 102 may notify the UE 102 to reattach (e.g. detach/attach) (step 16 of FIG. 15). In response, UE 102 may detach and attach with the network (step 17 of FIG. 15). In the reattachment, the SMF 120 may select the (more optimal) UPF 2 122a for the session migration (step 18 of FIG. 15). SRv6 data packets may now be communicated in the PDU session of UE 102 between the indicator points as shown (see indicator points 19, 20, 12, and 22 of FIG. 15).

Figure 16:
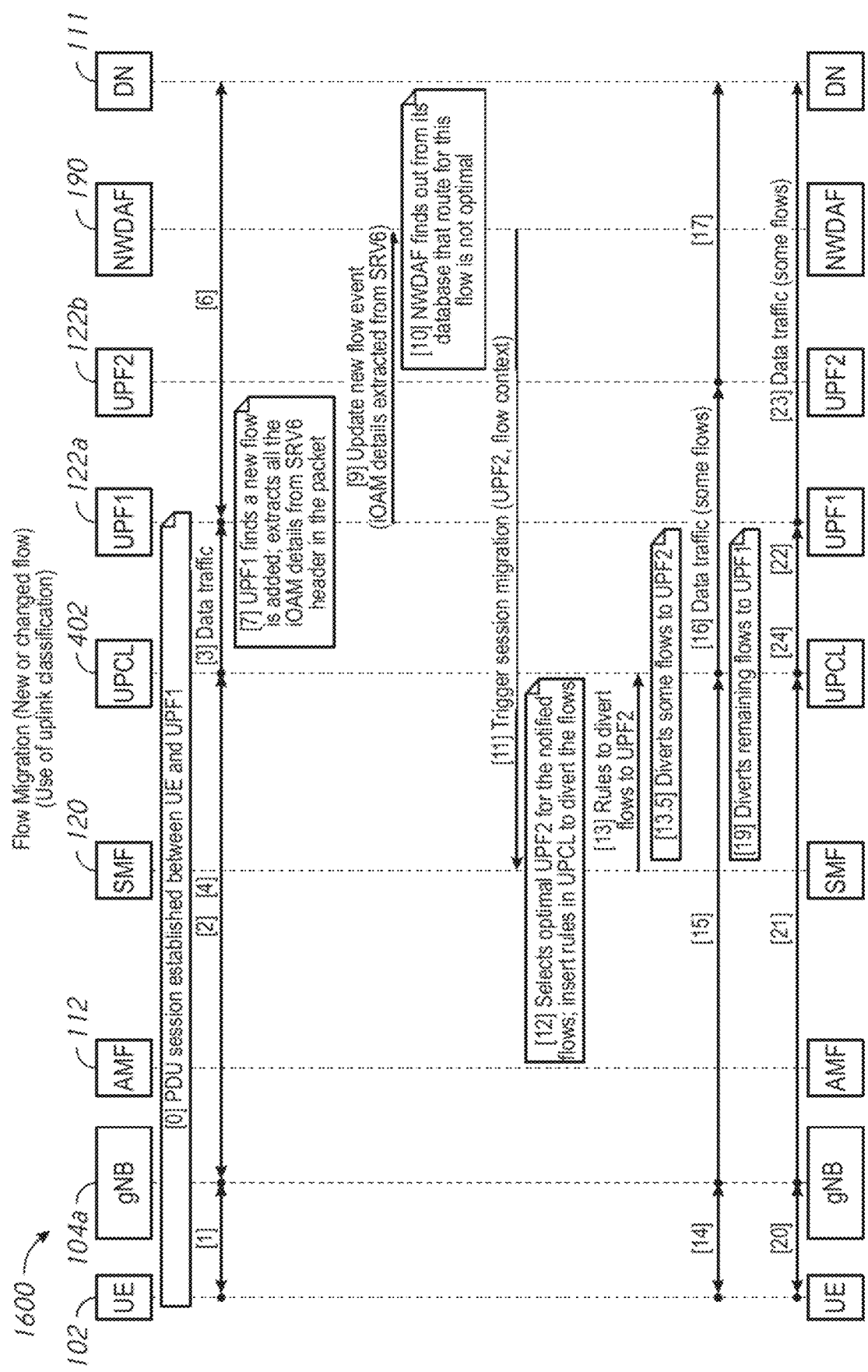
FIG. 16 is a call flow diagram for describing an end-to-end, SRv6 user-plane-based triggering method for flow migration in a mobile network, with use of uplink classification.

FIG. 16 is a call flow diagram 1600 for describing an end-to-end, SRv6 user-plane-based triggering method for flow migration in a mobile network, with use of uplink classification. In FIG. 16, UE 102 may be served by gNB1 104a and establish a PDU session with UPF 1 122a (step 0 of FIG. 16). SRv6 data packets are communicated in the PDU session of UE 102 between the indicator points as shown (see indicator points 1, 2, 3, 4, and 5 of FIG. 16). UE

102 may then establish a new PDU session (step 5 of FIG. 16). A sub-optimal path for this PDU session may result, which may include a (e.g. more lengthy) path between gNB2 104b and UPF 1 122a.

For the new session, the UE 102 or gNB2 104b may add or insert an ID of the new session (e.g. a session ID) in a header of a SRv6 data packet, as iOAM data. Upon receipt of the data packet, UPF 1 122a may extract (or otherwise read, identify, or detect) the iOAM details (i.e. the session ID) from the header (step 7 of FIG. 16). UPF 1 122a may send a message which includes the iOAM details to the NWDAF 190 (step 9 of FIG. 16). In response, NWDAF 190 may perform analytics for session or flow migration for the UE 102. Here, NWDAF 190 may consult a database or otherwise determine whether the route for the session/flow is less than optimal (step 10 of FIG. 16).

If so, the NWDAF 190 may send to SMF 120 a message which indicates an instruction for session/flow migration for the UE 102 and/or contains resulting data from the analytics (step 11 of FIG. 16). Here, in particular, NWDAF 190 may send an identification of UPF 2 122b and data corresponding to the session context. In response, SMF 120 may perform session migration for the UE 102. Here, SMF 120 may select (the more optimal) UPF 2 122b for one or more notified flows and insert rules in UPCL 402 to divert the flows (step 12 of FIG. 16). SMF 120 may send to UPCL 402 one or more messages which indicate the rules to divert flows to UPF 2 122b (step 13 of FIG. 16). In response, UPCL 402 operates to divert some of its flows to UPF 2 122b (step 13.5 of FIG. 16). SRv6 data packets are communicated between the indicator points as shown (see indicator points 14, 15, 16, 17, and 18 of FIG. 16). UPCL 402 then operates to divert remaining flows to UPF 1 122a (step 19 of FIG. 16). SRv6 data packets are communicated between the indicator points as shown (see indicator points 20, 21, 22, 23, and 24 of FIG. 16).

In some alternative implementations of the techniques of FIGS. 14A-15B, 15, and 16, the UPF 1 122a may communicate the one or more messages to an application function (AF) instead of NWDAF 190, so that the AF may (determine whether to) request and receive the resulting data from the analytics performed by NWDAF 190. Here, the AF may subsequently (determine whether to) send to SMF 120 the one or more messages to indicate an instruction and/or contain the resulting data from the analytics. In other alternative implementations, UPF 1 122a may communicate the one or more messages to SMF 120 instead of NWDAF 190, so that SMF 120 may (determine whether to) request and receive from NWDAF 190 the resulting data from the analytics.

Regarding the implementations above, note that 5G may or may not allow a UE to insert an SRH and associated metadata in a given data packet. If 5G allows a UE to insert the SRH and associated metadata (e.g. ID of base station or session), then in some implementations it is preferred that the UE (instead of the base station) insert the SRH and associated metadata. Otherwise, it is preferred that the base station insert the SRH and associated metadata.

Some implementations of the present disclosure have been shown in the figures to apply to a 5G mobile network; however, implementations may be readily applied to other suitable types mobile networks, such as 4G, Long Term Evolution (LTE) based networks having a control and user plane separation (CUPS) architecture, as one ordinarily skilled in the art will readily appreciate. In 4G/LTE with CUPS, the user plane function may be a gateway—user plane (GW-U). As other examples, the SMF may instead be a GW—control plane (GW-C), the AMF may instead be a mobility management entity (MME), the PCF may instead be a policy and control rules function (PCRF). The SMF and GW-C may be more generally referred to as a CP entity for session management. Other naming conventions may be adopted or realized.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first UPF could be termed a second UPF, and similarly, a second UPF could be termed a first UPF, without changing the meaning of the description, so long as all occurrences of the "first UPF" are renamed consistently and all occurrences of the "second UPF" are renamed consistently. The first UPF and the second UPF are both UPFs, but they are not the same UPF.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
    at a first user plane function (UPF) node for use in a mobile network, receiving a data packet from a user equipment (UE) which is operative to communicate via a serving base station (BS) of the mobile network in one or more protocol data unit (PDU) sessions anchored at the UPF node, wherein the data packet is associated with a first PDU session anchored at the UPF node;
    receiving a first packet transmitted by the UE, the first packet indicating a change to the first PDU session associated with the UE;
    triggered by and responsive to the first packet, accessing, by a session management function (SMF) node, information from a network data analytics function (NWDAF) node, the information including analytics data for PDU session migration of the first PDU session to a different UPF node; and
    causing, by the SMF node, migration of the first PDU session to a different UPF node based on the information obtained from the NW DAF node.

2. The method of claim 1, wherein the first packet indicating a change to the first PDU session comprises a PDU session identifier added by the UE.

3. The method of claim 1, wherein the UPF node implements a user plane function (UPF) in a 5G mobile network.

4. The method of claim 1, wherein the analytics data comprises one or more instructions to perform session migration.

5. The method of claim 1, wherein the change comprises an identifier indicating a new serving base station or new PDU session of the UE.

6. The method of claim 5, wherein the identifier comprises a session identifier (ID) of the new PDU session of the UE.

7. The method of claim 1, wherein the change comprises an identifier in a header of the first packet.

8. The method of claim 7, wherein the identifier comprises a type-length-value (TLV) in a segment routing header of the first packet.

9. The method of claim 1, further comprising:
    at the NWDAF node:
       receiving a first message from the UPF node;
       performing analytics in response to receiving the first message; and
       sending, to the SMF node, a second message which includes an instruction to perform session or flow migration and/or contains resulting data from the analytics.

10. The method of claim 9, further comprising:
    at the SMF node:
       receiving the second message from the NWDAF node; and
       responsive to the second message, performing session migration for the UE for migrating the first PDU session of the UE from the first UPF node to the different UPF node.

11. A system comprising:
    a user plane function (UPF) node for use in a mobile network, the UPF node operative to:
    receive a data packet from a user equipment (UE) which is operative to communicate via a serving base station (BS) of the mobile network in one or more protocol data unit (PDU) sessions anchored at the UPF node, wherein the data packet is associated with a first PDU session anchored at the UPF node; and
    receive a first packet transmitted by the UE, the first packet indicating a change to the first PDU session associated with the UE; and
    a session management function (SMF) node operative to:
    triggered by and responsive to the first packet, access, information from a network data analytics function (NWDAF) node, the information including analytics data for PDU session migration of the first PDU session to a different UPF node; and cause migration of the first PDU session to a different UPF node based on the information obtained from the NWDAF node.

12. The system of claim 11, wherein the first packet indicating a change to the first PDU session comprises a PDU session identifier added by the UE.

13. The system of claim 11, wherein the UPF node implements a user plane function (UPF) in a 5G mobile network.

14. The system of claim 11, wherein the analytics data comprises one or more instructions to perform session migration.

15. The system of claim 11, wherein the change comprises an identifier indicating a new serving base station or new PDU session of the UE.

16. The system of claim 15, wherein the identifier comprises a session identifier (ID) of the new PDU session of the UE.

17. The system of claim 11, wherein the change comprises an identifier in a header of the first packet.

18. The system of claim 17, wherein the identifier comprises a type-length-value (TLV) in a segment routing header of the first packet.

19. The system of claim 11, further comprising:
    the NWDAF node, wherein the NWDAF node is operative to:
       receive a first message from the UPF node;
       perform analytics in response to receiving the first message; and
       send, to the SMF node, a second message which includes an instruction to perform session or flow migration and/or contains resulting data from the analytics.

20. The system of claim 19, wherein the SMF node is operative to:
    receive the second message from the NWDAF node; and
    responsive to the second message, perform session migration for the UE for migrating the first PDU session of the UE from the first UPF node to the different UPF node.

* * * * *

UNITED STATES PATENT AND TRADEMARK OFFICE
CERTIFICATE OF CORRECTION

PATENT NO. : 11,678,228 B2
APPLICATION NO. : 17/542826
DATED : June 13, 2023
INVENTOR(S) : Vimal Srivastava et al.

Page 1 of 1

It is certified that error appears in the above-identified patent and that said Letters Patent is hereby corrected as shown below:

In the Claims

Column 19, Line 25, please replace "from the NW DAF node." with --from the NWDAF node.--

Signed and Sealed this
Nineteenth Day of September, 2023

Katherine Kelly Vidal
*Director of the United States Patent and Trademark Office*